US012687242B2

(12) United States Patent
He et al.

(10) Patent No.: US 12,687,242 B2
(45) Date of Patent: Jul. 21, 2026

(54) ELECTRONIC EXPANSION VALVE

(71) Applicant: ZHEJIANG DUNAN ARTIFICIAL ENVIRONMENT CO., LTD., Shaoxing (CN)

(72) Inventors: Yuchen He, Shaoxing (CN); Guanjun Xu, Shaoxing (CN); Yonghao Chen, Shaoxing (CN); Jun Zhao, Shaoxing (CN); Hongfeng Huang, Shaoxing (CN); Tonghui Liu, Shaoxing (CN); Qiubo He, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 158 days.

(21) Appl. No.: 18/697,642

(22) PCT Filed: Sep. 30, 2022

(86) PCT No.: PCT/CN2022/123582
§ 371 (c)(1),
(2) Date: Apr. 1, 2024

(87) PCT Pub. No.: WO2023/051824
PCT Pub. Date: Apr. 6, 2023

(65) Prior Publication Data
US 2024/0410495 A1       Dec. 12, 2024

(30) Foreign Application Priority Data

Sep. 30, 2021   (CN) ......................... 202122404603.6
Sep. 30, 2021   (CN) ......................... 202122404672.7
(Continued)

(51) Int. Cl.
*F16K 39/02*        (2006.01)
*F25B 41/34*        (2021.01)

(52) U.S. Cl.
CPC ............ *F16K 39/022* (2013.01); *F25B 41/34* (2021.01)

(58) Field of Classification Search
CPC ........ F16K 39/022; F16K 1/36; F16K 27/029; F16K 31/06; F16K 1/32; F25B 41/34; Y02B 30/70
See application file for complete search history.

(56) References Cited

U.S. PATENT DOCUMENTS

2015/0316168 A1    11/2015   Lv
2019/0368618 A1    12/2019   Wei

FOREIGN PATENT DOCUMENTS

CN          103574062 A      2/2014
CN          108343749 A  *   7/2018   .............. F25B 41/31
(Continued)

OTHER PUBLICATIONS

The Supplementary search report of EP application No. 22875204.4 issued on Jul. 23, 2025.
The first office action of counterpart KR application No. 10-2024-7012284 issued on Aug. 14, 2025.

*Primary Examiner* — Frantz F Jules
*Assistant Examiner* — Emmanuel E Duke
(74) *Attorney, Agent, or Firm* — The Sun IP Law

(57)               ABSTRACT

The present disclosure provides an electronic expansion valve, which includes: a valve body having an accommodating cavity and a valve port, and the valve port communicates with the accommodating cavity; a guide sleeve, which is disposed in the accommodating cavity; a valve head, which is movably disposed in the guide sleeve and configured for blocking or opening the valve port, and a balance channel is disposed in the valve head so as to enable two ends of the valve head to be communicated; the valve head has a first end and a second end which are oppositely disposed, the first end is configured for blocking the valve (Continued)

port, a refrigerant medium and the first end have a first stress area $S1$, the refrigerant medium and the second end have a second stress area $S2$, and $-1.3 \text{ mm}^2 \leq S1 - S2 \leq 1.3 \text{ mm}^2$.

37 Claims, 20 Drawing Sheets

(30) Foreign Application Priority Data

| | | |
|---|---|---|
| Sep. 30, 2021 | (CN) | 202122406183.5 |
| Sep. 30, 2021 | (CN) | 202122407783.3 |
| Sep. 30, 2021 | (CN) | 202122410246.4 |
| Sep. 30, 2021 | (CN) | 202122410892.0 |
| Sep. 30, 2021 | (CN) | 202122411574.6 |
| Sep. 30, 2021 | (CN) | 202122433317.2 |

(56) References Cited

FOREIGN PATENT DOCUMENTS

| | | | | | |
|---|---|---|---|---|---|
| CN | 108999990 | A | | 12/2018 | |
| CN | 109323006 | A | * | 2/2019 | ............. F16K 1/52 |
| CN | 209180369 | U | | 7/2019 | |
| CN | 210372066 | U | | 4/2020 | |
| CN | 210920266 | U | | 7/2020 | |
| CN | 112576769 | A | | 3/2021 | |
| CN | 216200566 | U | * | 4/2022 | |
| KR | 20-2021-0000285 | U | | 2/2021 | |
| WO | 2019124940 | A1 | | 6/2019 | |

* cited by examiner

ELECTRONIC EXPANSION VALVE

CROSS-REFERENCE TO RELATED APPLICATION

This disclosure claims priority to Chinese Patent Application No. 202122404672.7 filed to the China National Intellectual Property Administration on Sep. 30, 2021 and entitled "Electronic Expansion Valve".

This disclosure claims priority to Chinese Patent Application No. 202122433317.2 filed to the China National Intellectual Property Administration on Sep. 30, 2021 and entitled "Electronic Expansion Valve".

This disclosure claims priority to Chinese Patent Application No. 202122410246.4 filed to the China National Intellectual Property Administration on Sep. 30, 2021 and entitled "Electronic Expansion Valve".

This disclosure claims priority to Chinese Patent Application No. 202122407783.3 filed to the China National Intellectual Property Administration on Sep. 30, 2021 and entitled "Electronic Expansion Valve".

This disclosure claims priority to Chinese Patent Application No. 202122404603.6 filed to the State Intellectual Property Office of P. R. China (SIPO) on Sep. 30, 2021 and entitled "Electronic Expansion Valve".

This disclosure claims priority to Chinese Patent Application No. 202122410892.0 filed to the China National Intellectual Property Administration on Sep. 30, 2021 and entitled "Electronic Expansion Valve".

This disclosure claims priority to Chinese Patent Application No. 202122406183.5 filed to the China National Intellectual Property Administration on Sep. 30, 2021 and entitled "Electronic Expansion Valve".

This disclosure claims priority to Chinese Patent Application No. 202122411574.6 filed to the China National Intellectual Property Administration on Sep. 30, 2021 and entitled "Electronic Expansion Valve".

TECHNICAL FIELD

The present disclosure relates to the technical field of valves, and in particular to an electronic expansion valve.

BACKGROUND

As a novel control element, an electronic expansion valve has become an important part of intelligence of a refrigeration system. The electronic expansion valve generally includes a valve body and a valve head, the valve body has an accommodating cavity and a valve port, the valve head is movably disposed in the valve cavity to close or open the valve port. However, for an existing electronic expansion valve, a difference between pressures applied to two ends of the valve head is too large, so that the reliability of action of the electronic expansion valve is poor.

SUMMARY

The present disclosure provides an electronic expansion valve, for solving a problem that the reliability of action of an electronic expansion valve in the relevant art is poor.

The present disclosure provides an electronic expansion valve, which includes: a valve body having an accommodating cavity and a valve port, and the valve port communicates with the accommodating cavity; a guide sleeve, which is disposed in the accommodating cavity; a valve head, which is movably disposed in the guide sleeve and configured for blocking or opening the valve port, and a balance channel is disposed in the valve head so as to enable two ends of the valve head to be communicated; the valve head has a first end and a second end which are oppositely disposed, the first end is configured for blocking the valve port, a refrigerant medium and the first end have a first stress area S1, the refrigerant medium and the second end have a second stress area S2, and $-1.3 \text{ mm}^2 \leq S1-S2 \leq 1.3 \text{ mm}^2$.

By adoption of the technical solution of the present disclosure, the first stress area and the second stress area are limited in the above range, so that when the refrigerant medium flows into the accommodating cavity from the valve port through the balance channel, pressures of the refrigerant medium in the accommodating cavity to the first end and the second end of the valve head are the same. By setting S1 and S2 in the above range, S1 and S2 are close to each other, so that after the electronic expansion valve is closed, pressures applied to the first end and the second end of the valve head are close to each other, then only friction force needs to be overcome during the opening and closing processes of the valve head, therefore, the action performance of the valve head assembly may be ensured, and the reliability of action of the electronic expansion valve may be improved.

In some embodiments, the valve head has a first communicating hole, a second communicating hole and a third communicating hole sequentially communicated along a direction from the first end to the second end, and an aperture of the first communicating hole and an aperture of the third communicating hole are greater than an aperture of the second communicating hole. The electronic expansion valve further includes: a screw, which is movably disposed in the accommodating cavity, and an end of the screw sequentially passes through the third communicating hole and the second communicating hole and extends into the first communicating hole; a valve sleeve, which is located in the first communicating hole, and is fixedly connected with the end part of the screw, a step face formed by the first communicating hole and the second communicating hole carries out axial limit on the valve sleeve, a first gap is formed between the screw and the second communicating hole, a second gap is formed between the screw and the valve sleeve, the first gap and the second gap are communicated to form the balance channel, and the first communicating hole and the third communicating hole are communicated through the balance channel; wherein an end face area of the first end is S11, an area of the step face formed by the first communicating hole and the second communicating hole is S12, and S1 is a sum of S11 and S12; an end face area of the second end is S21, an area of a step face formed by the third communicating hole and the second communicating hole is S22, and S2 is a sum of S21 and S22. Through the above design, the first stress area includes S11 and S12, and the second stress area includes S21 and S22, so that when the electronic expansion valve is designed, S11 and S21 may be enabled to be close as much as possible, S12 and S22 may be enabled to be close as much as possible, and finally, S1 and S2 are enabled to be close as much as possible.

In some embodiments, an outer diameter of a part, corresponding to the first communicating hole, of the valve head is D1, an outer diameter of the part, corresponding to the third communicating hole, of the valve head is D2, D1=D2; and the aperture of the first communicating hole is d1, the aperture of the third communicating hole is d2, and $-1 \text{ mm} \leq d1-d2 \leq 1 \text{ mm}$. By setting d1 and d2 in the above range, S12 and S22 are close as much as possible, and further, S1 and S2 are close as much as possible.

In some embodiments, a chamfer R1 is disposed on a peripheral surface of an end part of the first end, and R0.04 mm≤R1≤R0.8 mm. By setting R1 in the above range, the convenience of chamfering processing may be ensured, the service life of the valve head may be ensured, and too large difference between S11 and S12 also may be avoided.

In some embodiments, an outer diameter of the first end is greater than an outer diameter of the second end, a difference value between the outer diameter of the first end and the outer diameter of the second end is smaller than or equal to 4 mm, and a difference value between the aperture of the first communicating hole and the aperture of the third communicating hole is −1 mm to 1 mm. In the solution, the difference value between the outer diameter of the first end and the outer diameter of the second end and the difference value between the aperture of the first communicating hole and the aperture of the third communicating hole are cooperatively set in the above range, so that a difference value between S1 and S2 may be reduced as much as possible.

In some embodiments, a chamfer R2 is disposed on a peripheral surface of an end part of the first end, and R0.04 mm≤R2≤3 mm. By setting R2 in the above range, the convenience of chamfering processing may be ensured, the service life of the valve head may be ensured, and too large difference between S11 and S12 also may be avoided.

In some embodiments, a part, corresponding to the first communicating hole, of the valve head has a first section, a transition section and a second section sequentially connected along the direction from the first end to the second end, an outer diameter of the second section is smaller than an outer diameter of the first section, and an outer diameter of the transition section gradually decreases along a direction from the first section to the second section. In this way, a step structure on a peripheral surface of the valve head may be avoided, further, the smoothness of the peripheral surface of the valve head may be ensured, and meanwhile, processing and forming of the valve head may also be facilitated.

In some embodiments, the first communicating hole includes a first through hole and a second through hole disposed in a step, an aperture of the first through hole is greater than an aperture of the second through hole, the first through hole is disposed close to the valve port, a stepped face is disposed between the first through hole and the second through hole, an area of the stepped face is S10, and S1 is a sum of S10, S11 and S12; and/or, the third communicating hole includes a third through hole and a fourth through hole sequentially communicated, the fourth through hole is a conical hole, an aperture of the fourth through hole gradually increases towards a direction away from the valve port, a stress area of the fourth through hole is S20, and S2 is the sum of S20, S21 and S22. In this way, a worker may distinguish two end parts of the valve head, and further may assemble the valve head. Meanwhile, the above setting has a little influence on the difference value between the first stress area S1 and the second stress area S2.

In some embodiments, a chamfer R3 is disposed on a peripheral surface of an end part of the second end. Due to setting of R3, it may avoid burrs at the end part of the second end, thus ensuring smooth movement of the valve head.

BRIEF DESCRIPTION OF THE DRAWINGS

The drawings forming a part of the present disclosure in the specification are adopted to provide a further understanding to the present disclosure. Schematic embodiments of the present disclosure and descriptions thereof are adopted to

Figure 1:
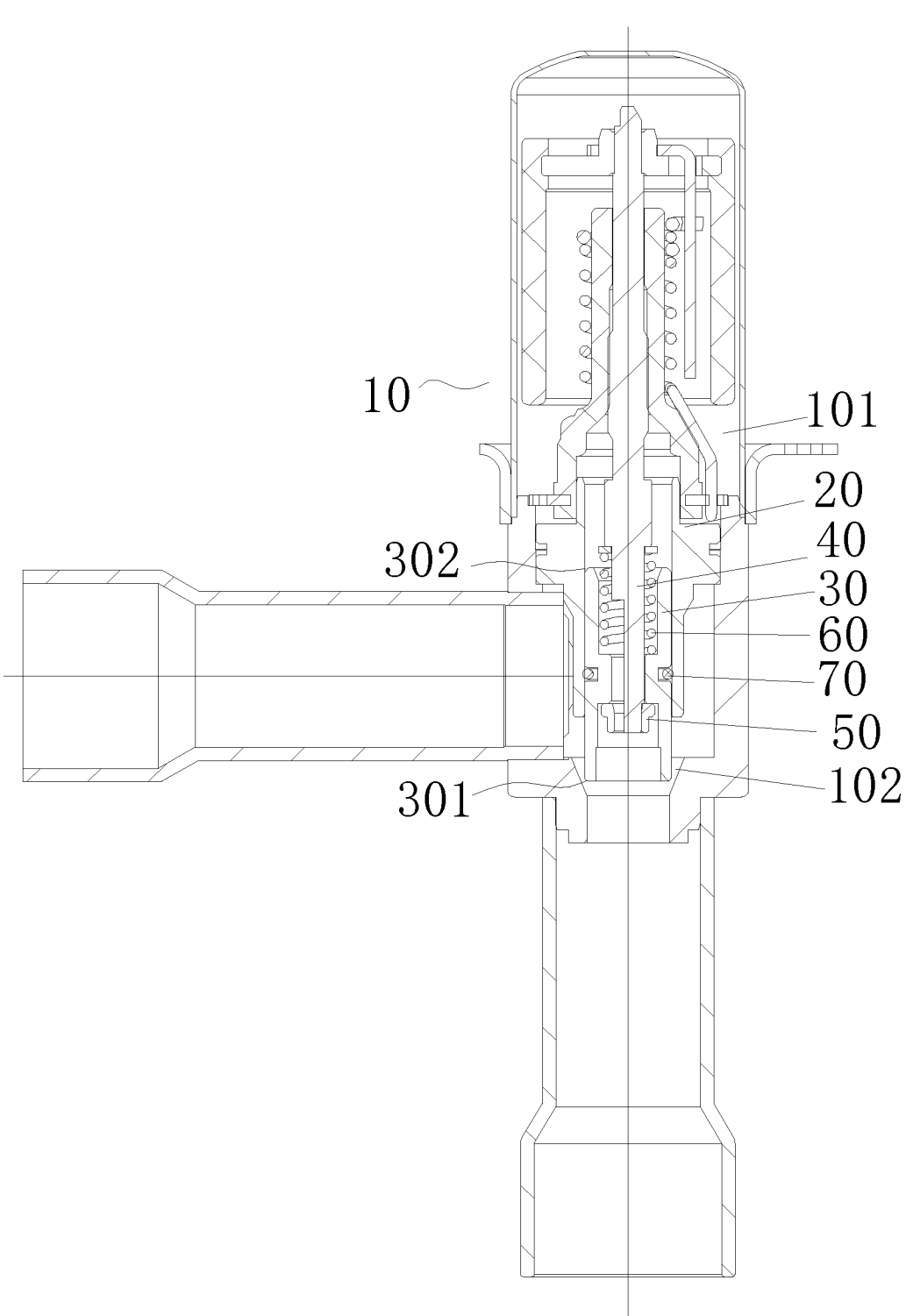

4 explain the present disclosure and not intended to form improper limits to the present disclosure. In the drawings:

FIG. 1 illustrates a schematic structure diagram of an electronic expansion valve provided by the present disclosure.

Figure 2:
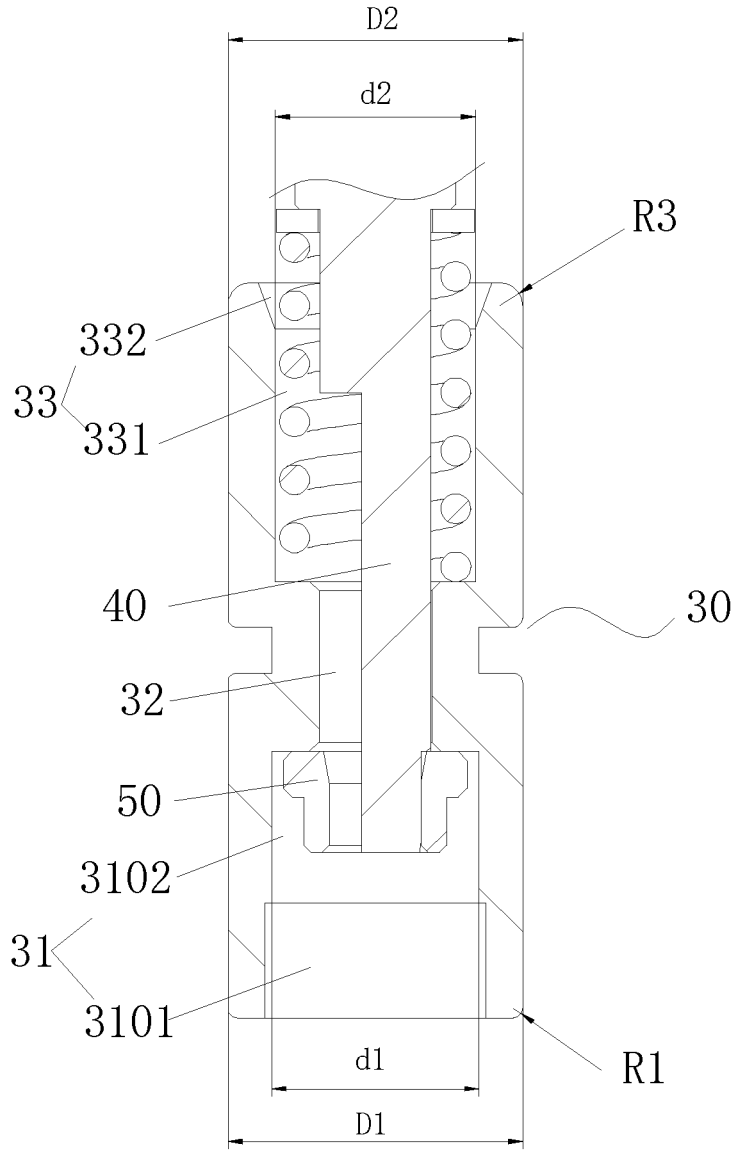

FIG. 2 illustrates a schematic structure diagram of a valve head provided by the present disclosure.

Figure 3:
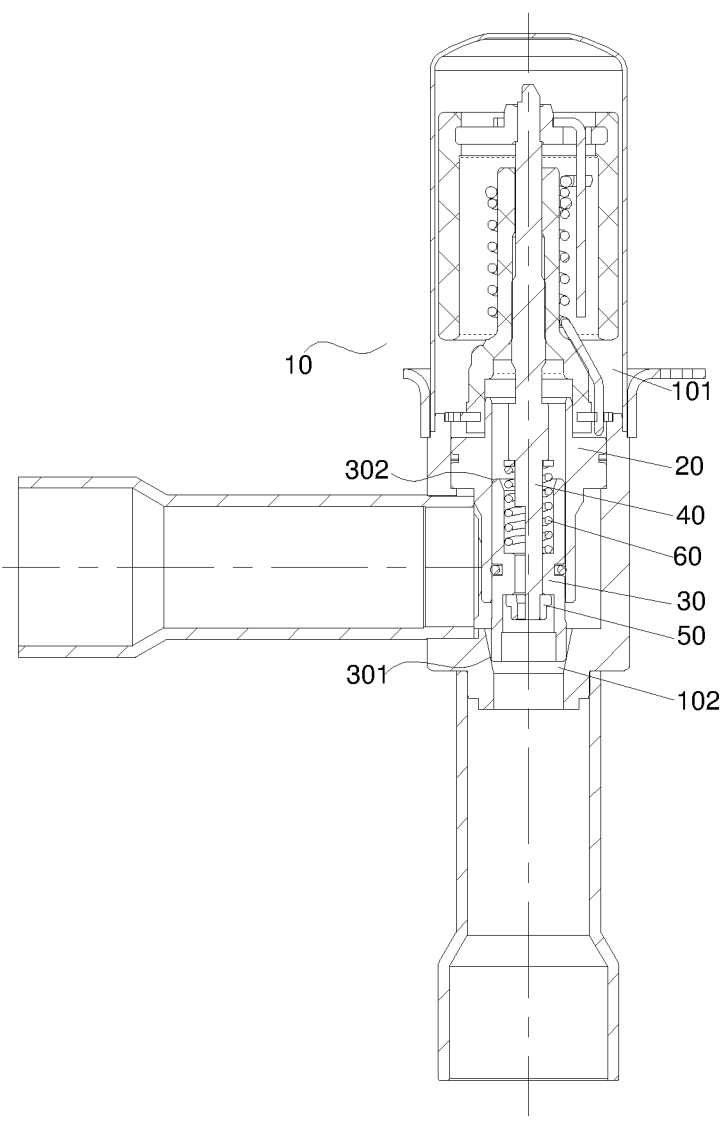

FIG. 3 illustrates a schematic structure diagram of an electronic expansion valve provided by the present disclosure.

Figure 4:
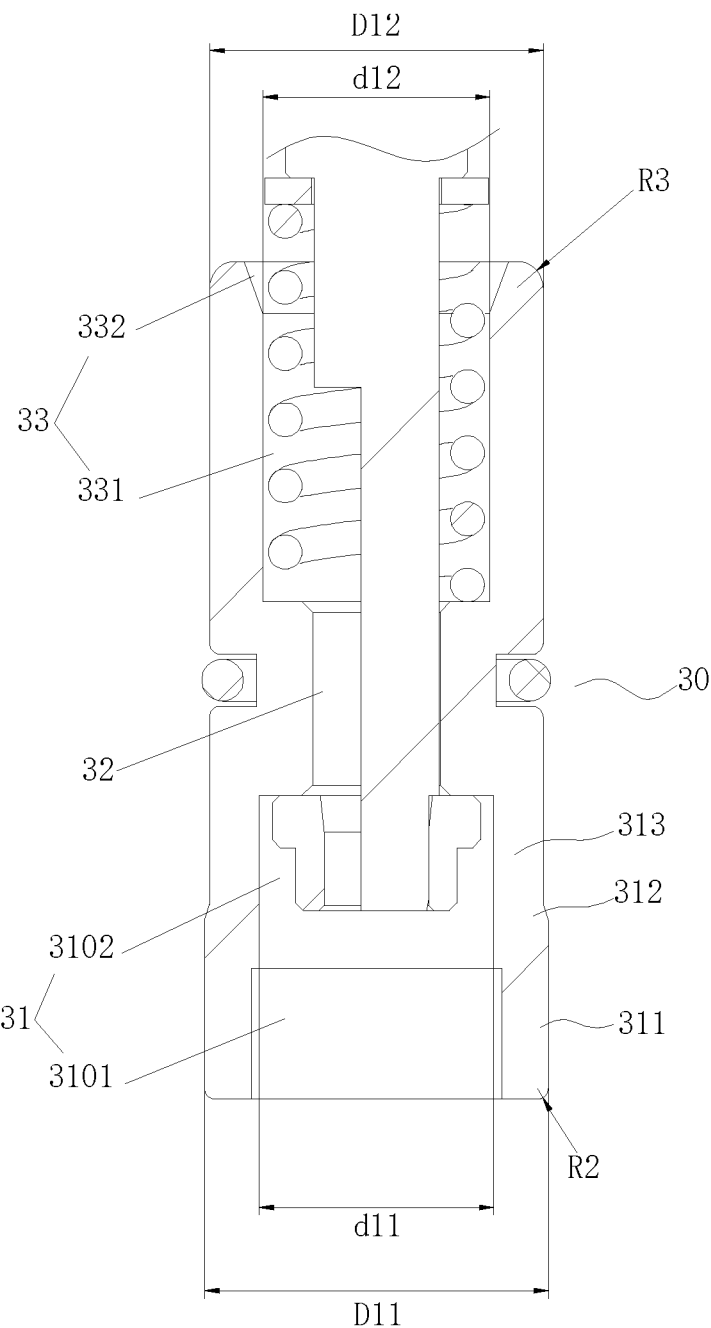

FIG. 4 illustrates a schematic structure diagram of a valve head provided by the present disclosure.

Figure 5:
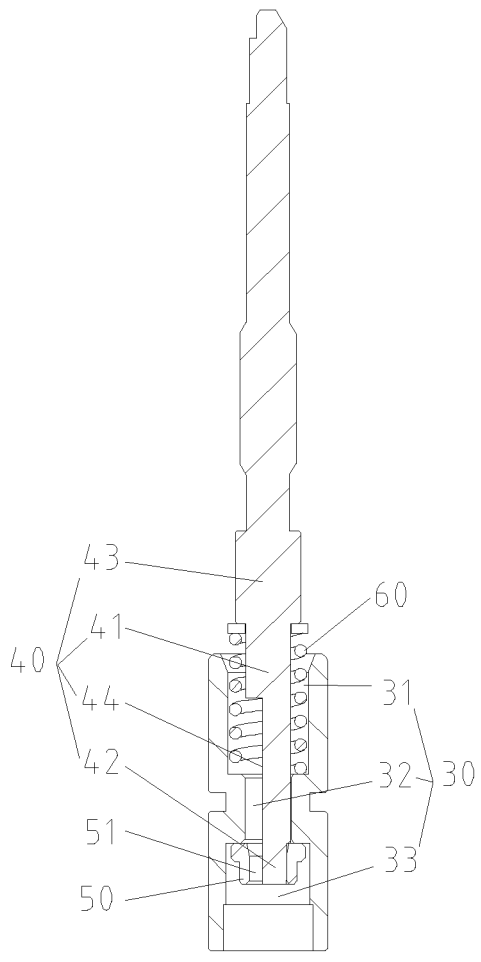

FIG. 5 illustrates a schematic diagram of a sectional view after assembly of a screw, a valve sleeve and a valve head provided by an embodiment of the present disclosure.

Figure 6:
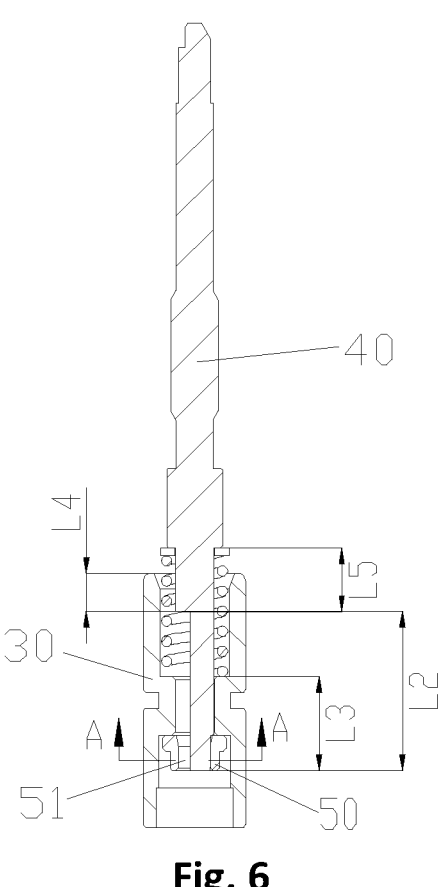

FIG. 6 illustrates a schematic dimension structure after assembly of a screw, a valve sleeve and a valve head provided by the present disclosure.

Figure 7:
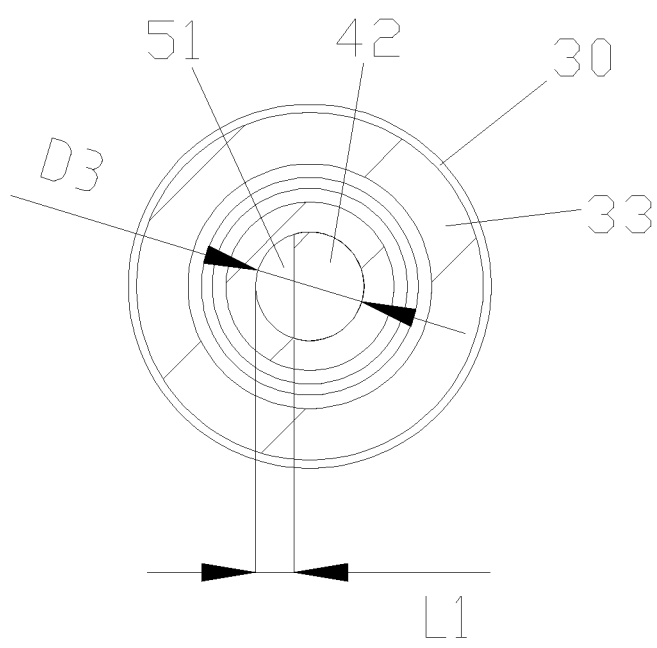

FIG. 7 illustrates a schematic diagram of a sectional view of A-A in FIG. 6.

Figure 8:
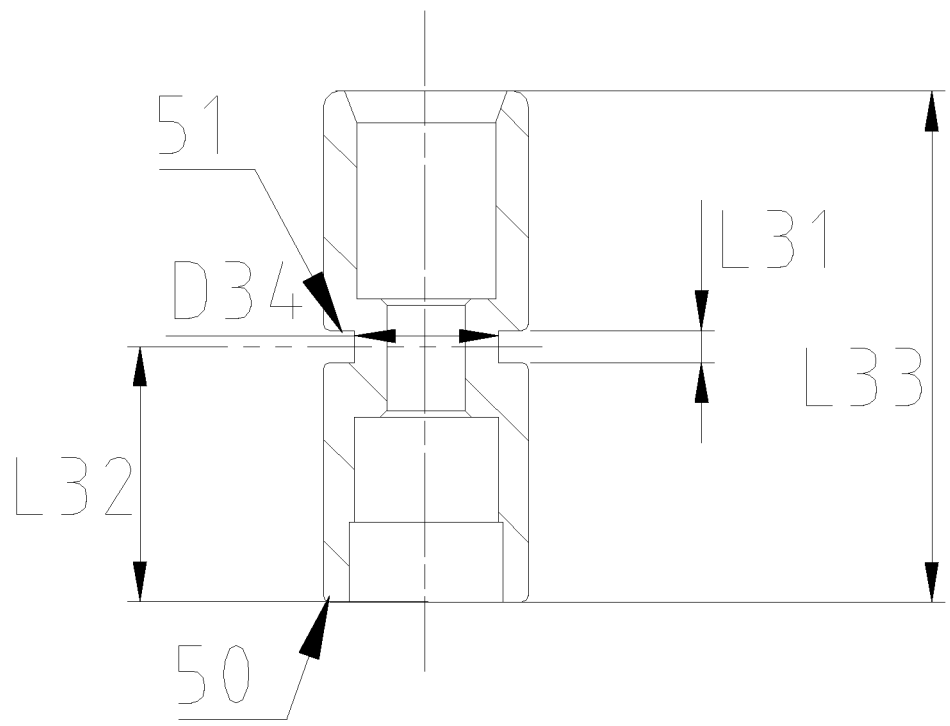

FIG. 8 illustrates a schematic structure diagram of a valve sleeve provided by the present disclosure.

Figure 9:
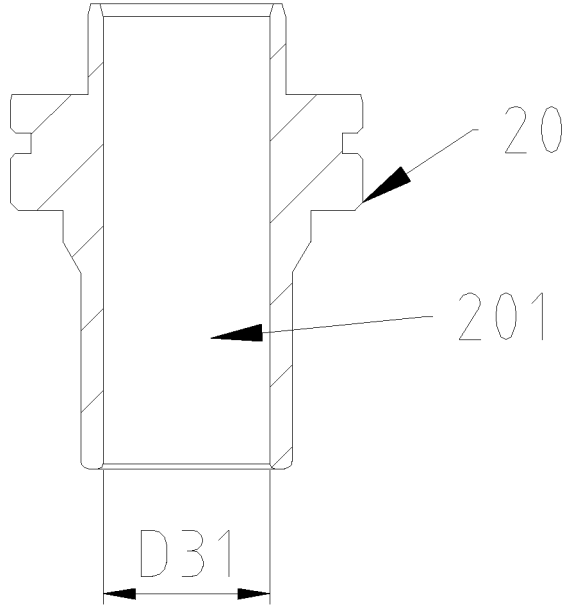

FIG. 9 illustrates a schematic structure diagram of a guide sleeve provided by the present disclosure.

Figure 10:
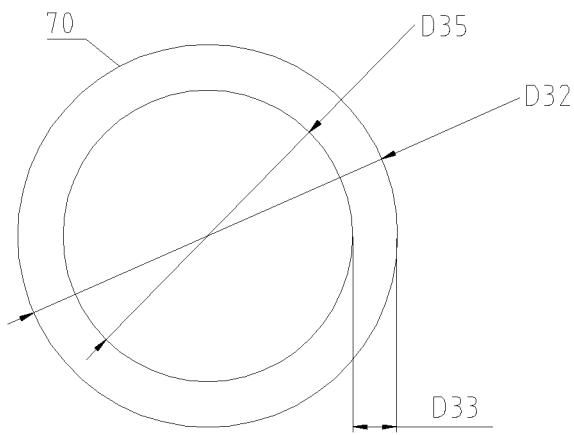

FIG. 10 illustrates a schematic structure diagram of a seal ring provided by the present disclosure.

Figure 11:
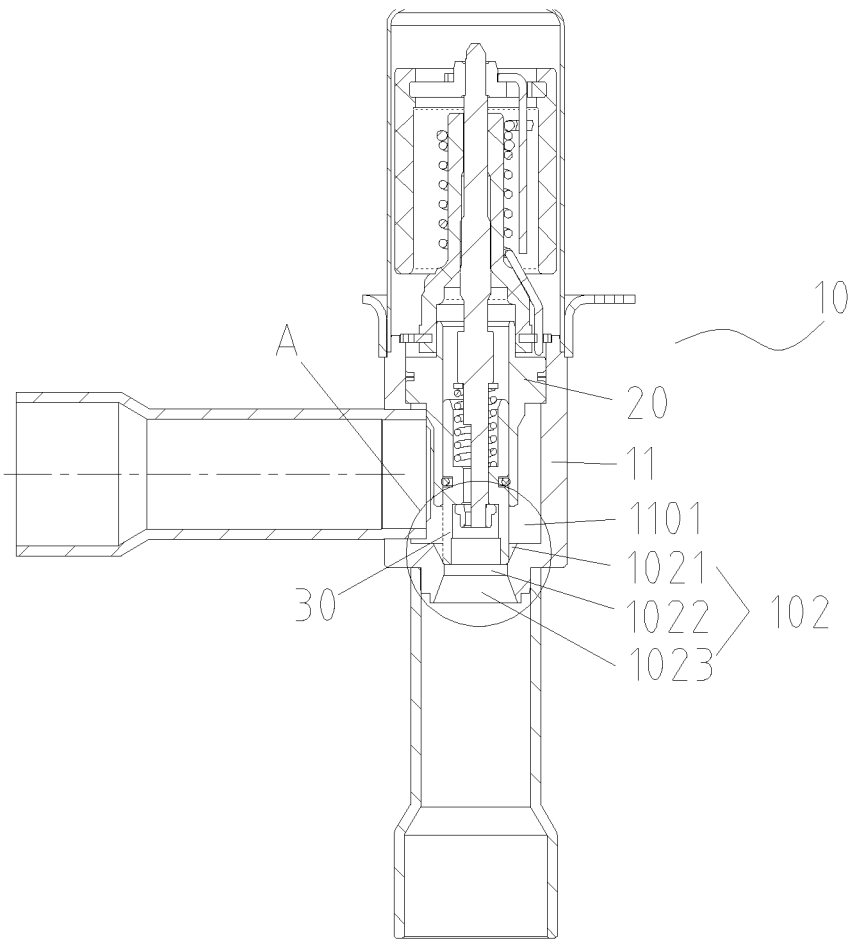

FIG. 11 illustrates a schematic diagram of a sectional view of an electronic expansion valve provided by the present disclosure.

Figure 12:
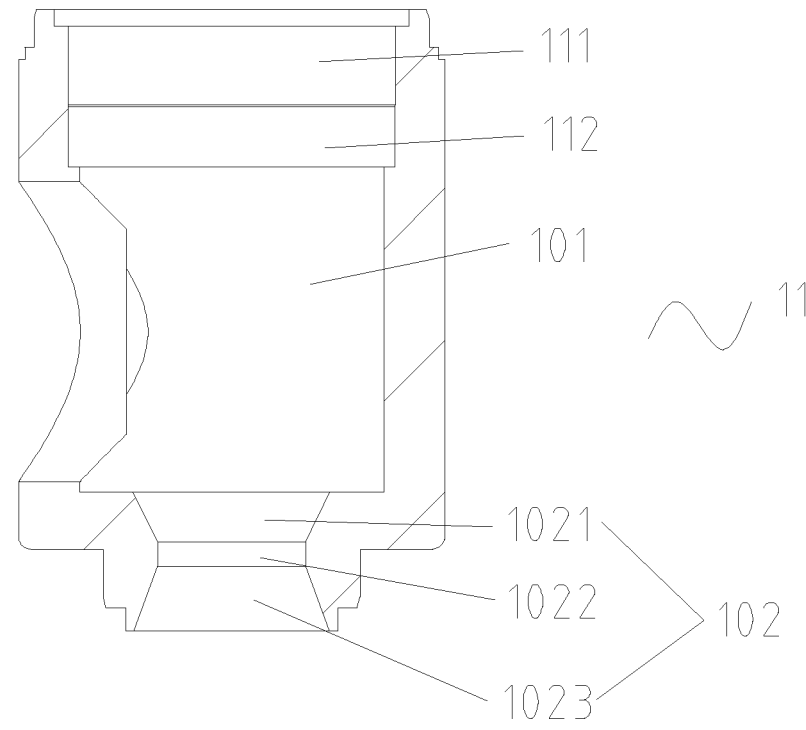

FIG. 12 illustrates a schematic diagram of a sectional view of a valve seat provided by the present disclosure.

Figure 13:
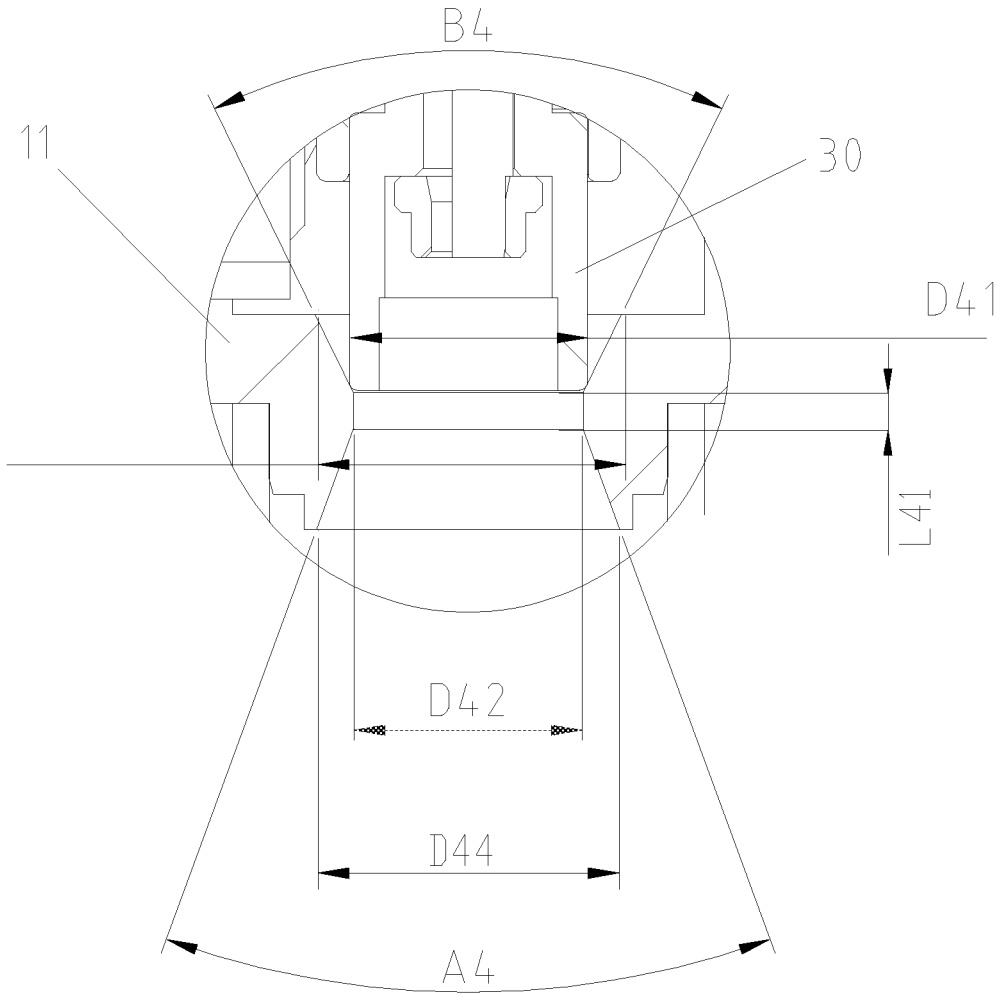

FIG. 13 illustrates a schematic dimension structure of A-A in FIG. 11.

Figure 14:
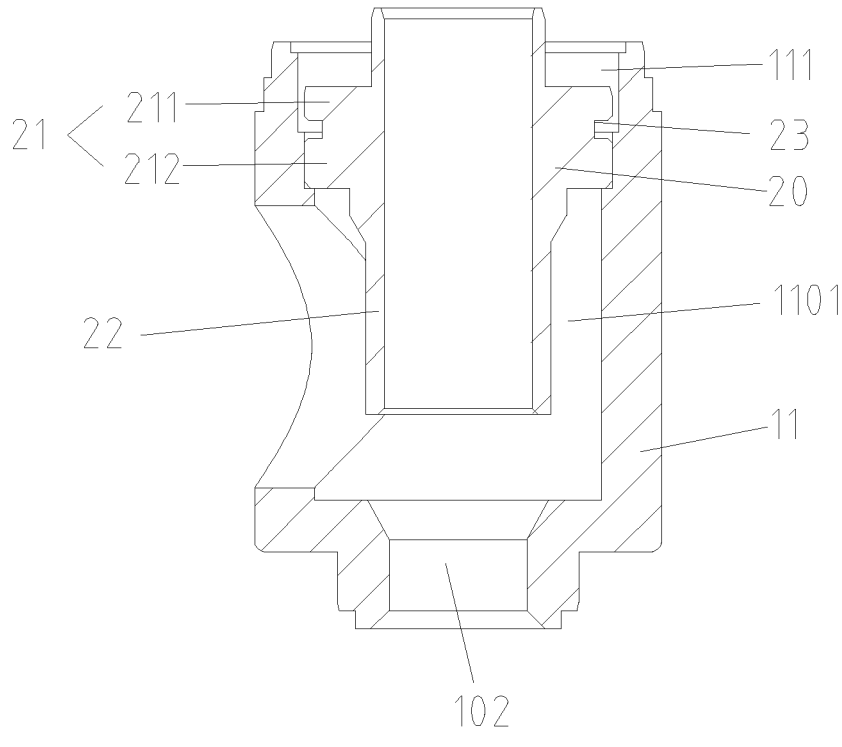

FIG. 14 illustrates a schematic diagram of a sectional view after assembly of a valve seat and a guide sleeve provided by an embodiment of the present disclosure.

Figure 15:
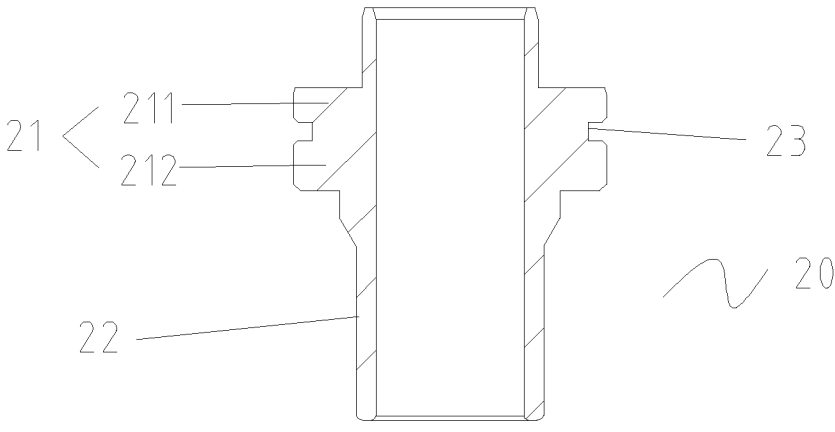

FIG. 15 illustrates a schematic diagram of a sectional view of a guide sleeve provided by the present disclosure.

Figure 16:
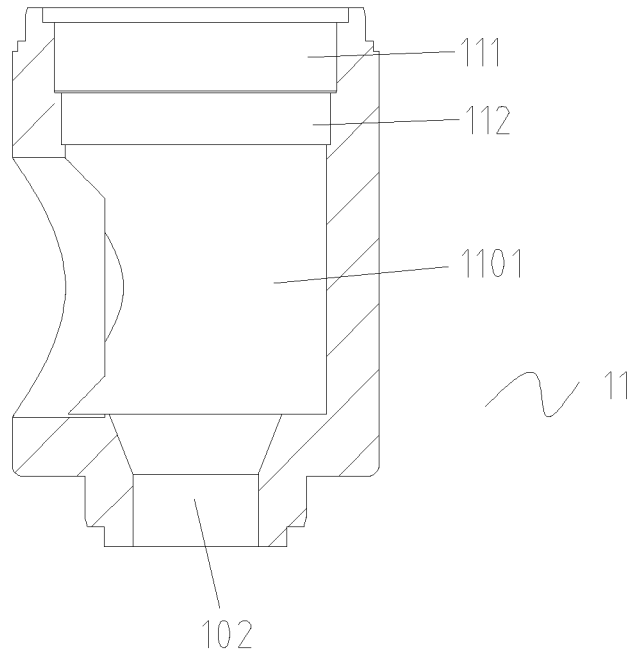

FIG. 16 illustrates a schematic diagram of a sectional view of a valve seat provided by the present disclosure.

Figure 17:
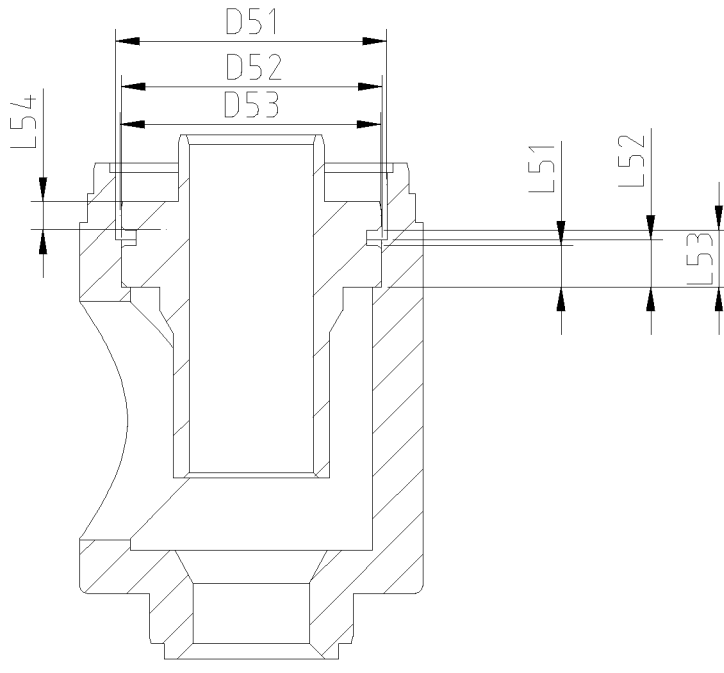

FIG. 17 illustrates a schematic dimension diagram of a valve seat and a guide sleeve provided by the present disclosure.

Figure 18:
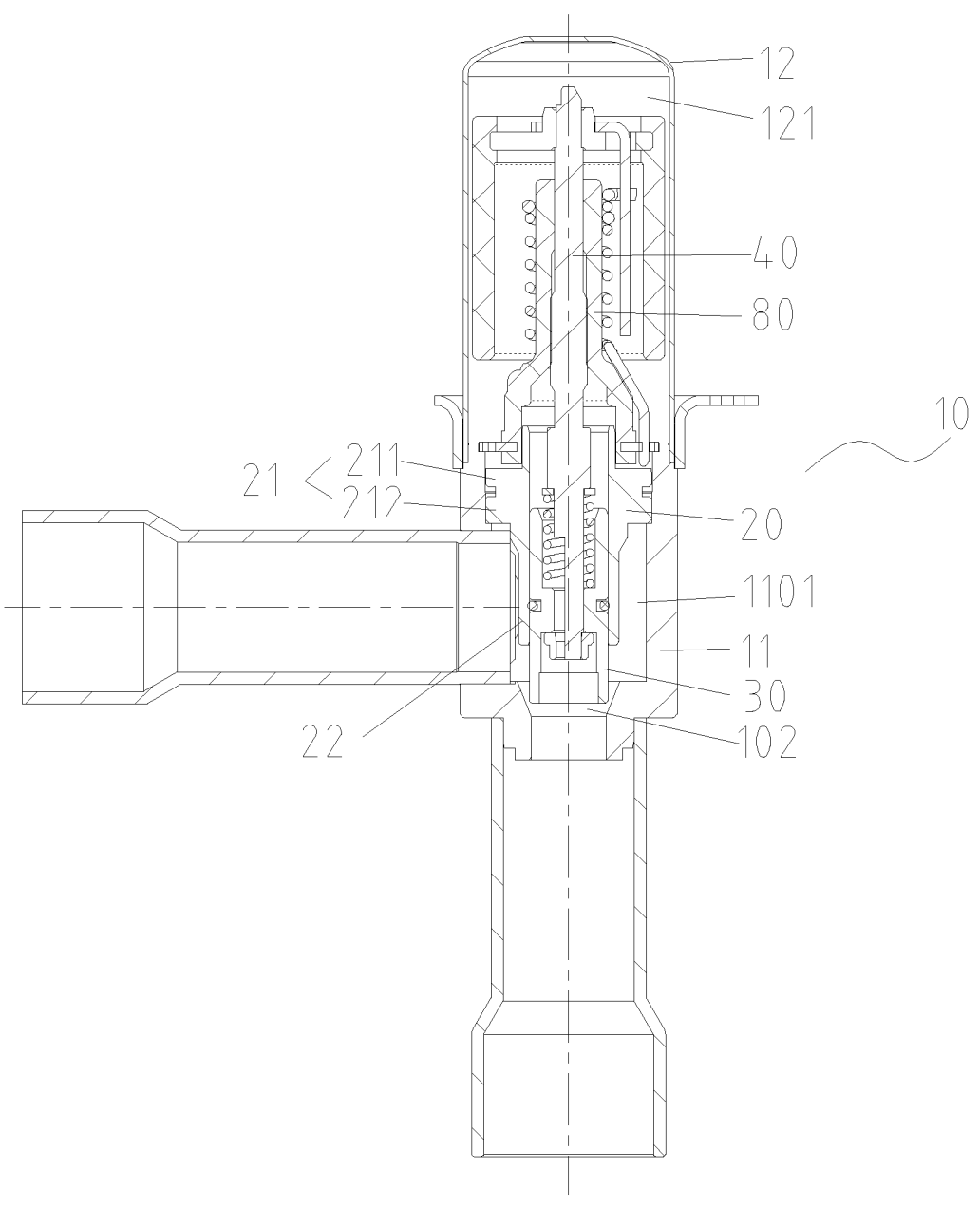

FIG. 18 illustrates a schematic diagram of a sectional view of an electronic expansion valve provided by the present disclosure.

Figure 19:
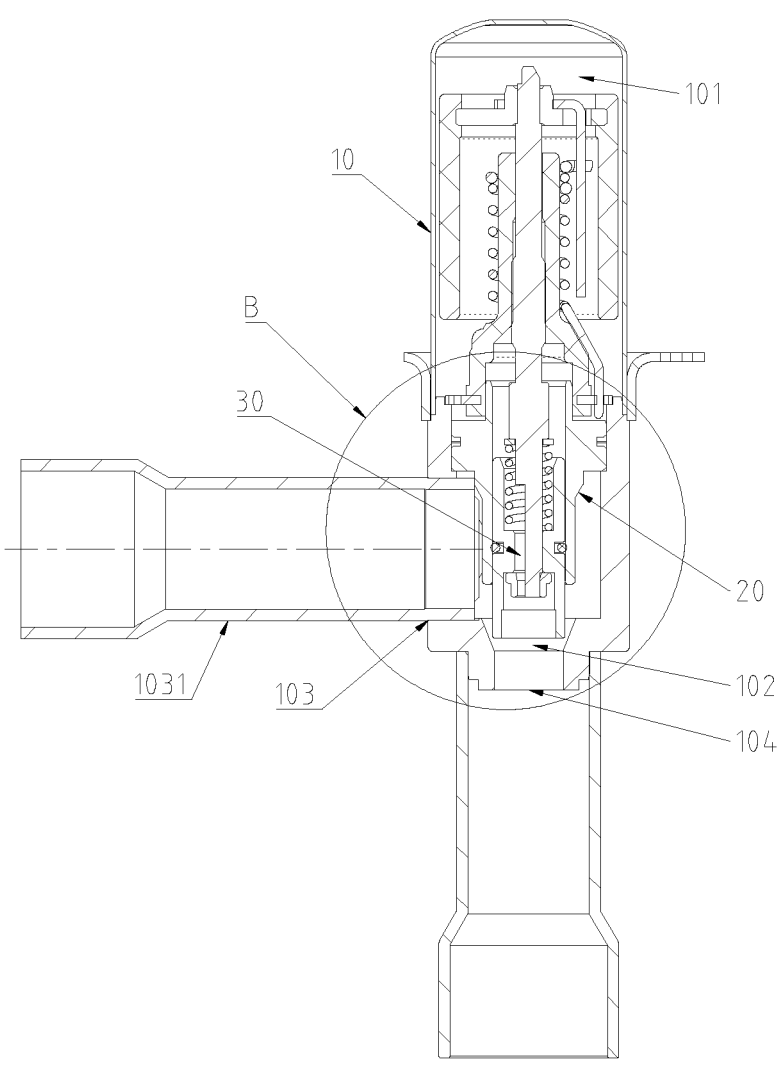

FIG. 19 illustrates a schematic structure diagram of an electronic expansion valve provided by the present disclosure.

Figure 20:
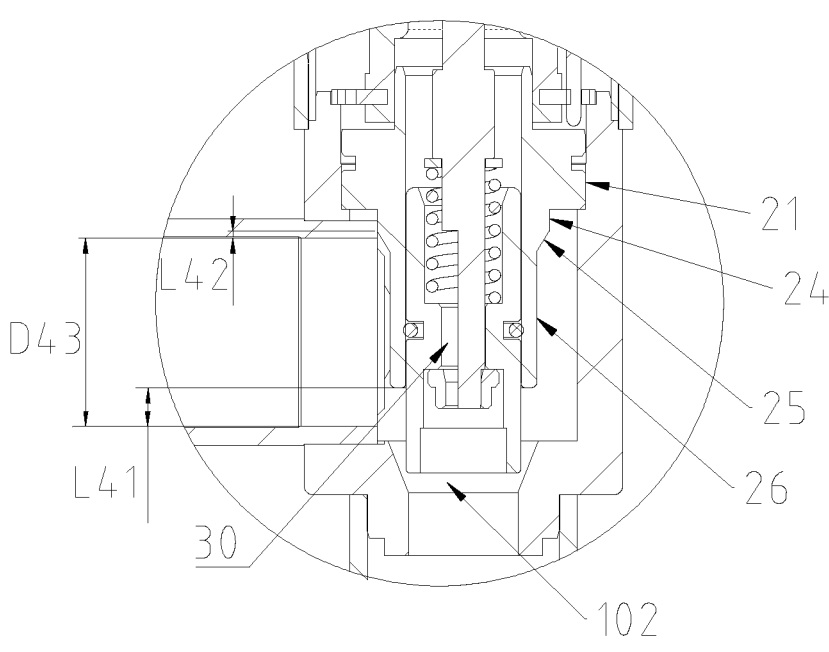

FIG. 20 illustrates a schematic diagram of an enlarged view of B in FIG. 19.

Figure 21:
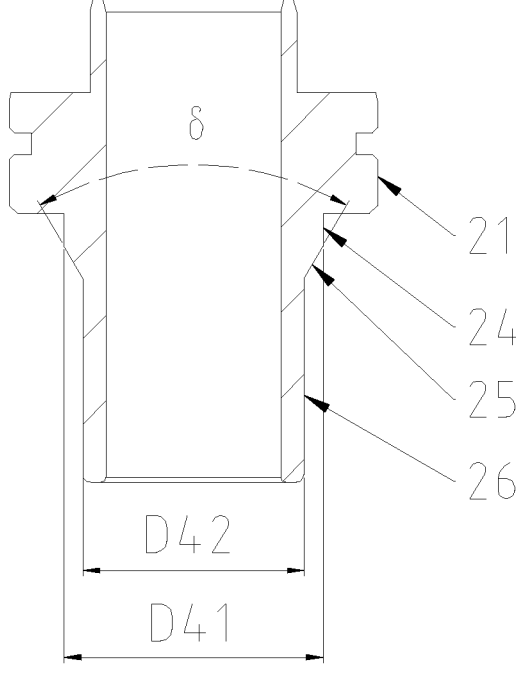

FIG. 21 illustrates a schematic structure diagram of a guide sleeve provided by the present disclosure.

Figure 22:
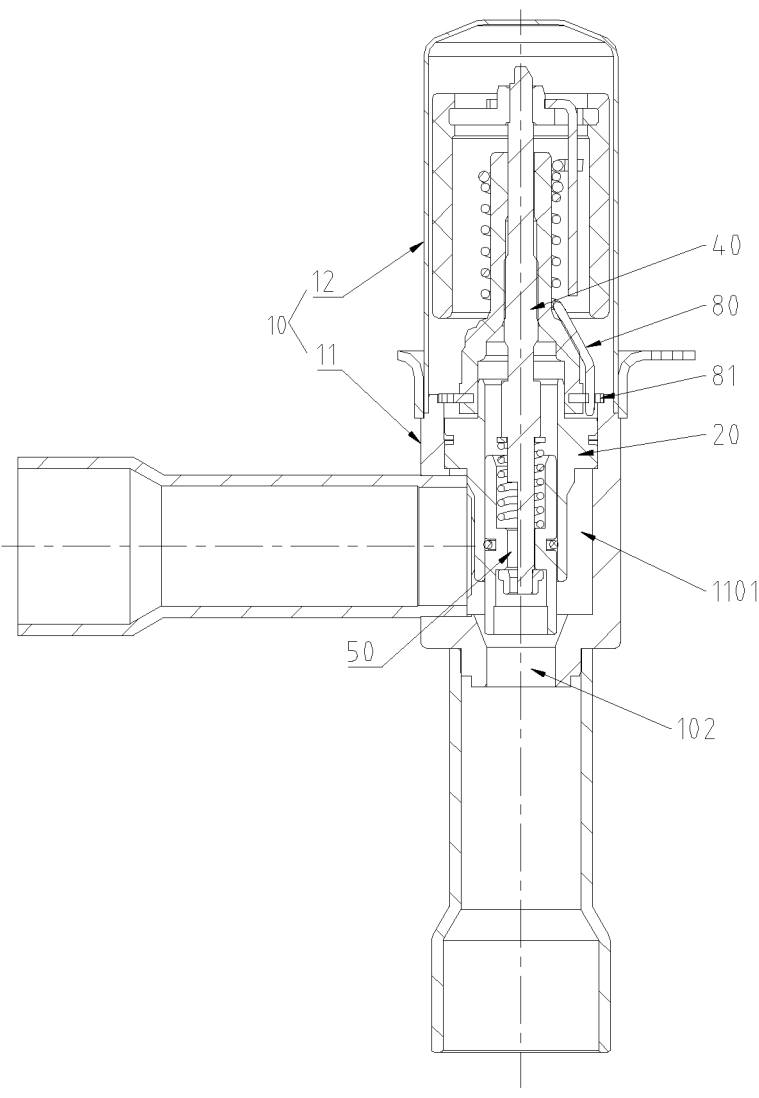

FIG. 22 illustrates a schematic structure diagram of an electronic expansion valve provided by the present disclosure.

Figure 23:
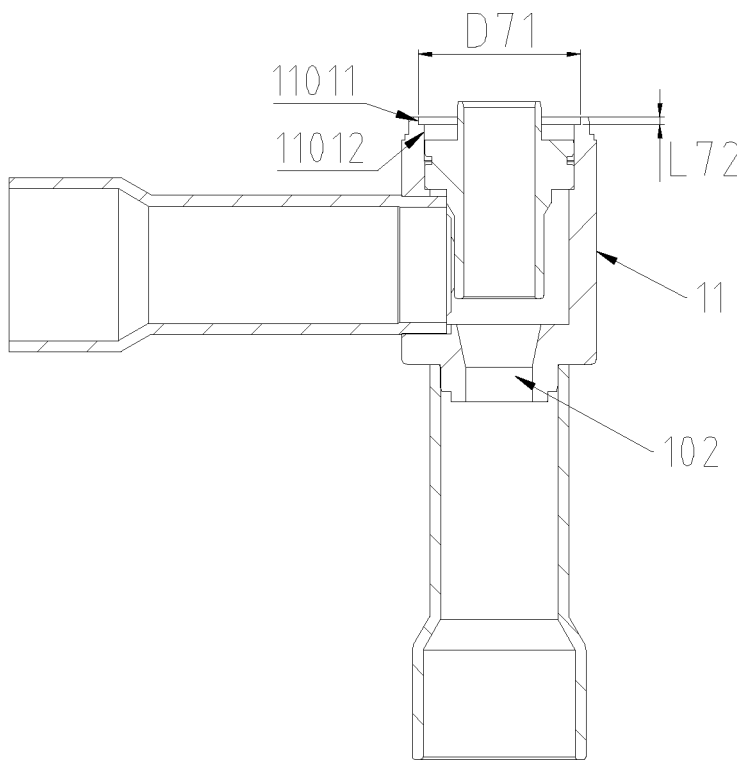

FIG. 23 illustrates a schematic structure diagram of assembly of a valve seat and a guide sleeve in FIG. 22.

Figure 24:
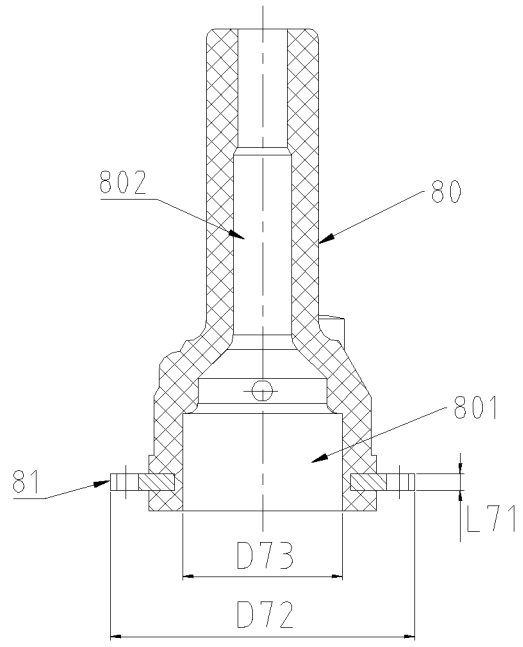

FIG. 24 illustrates a schematic structure diagram of a nut sleeve in FIG. 22.

Figure 25:
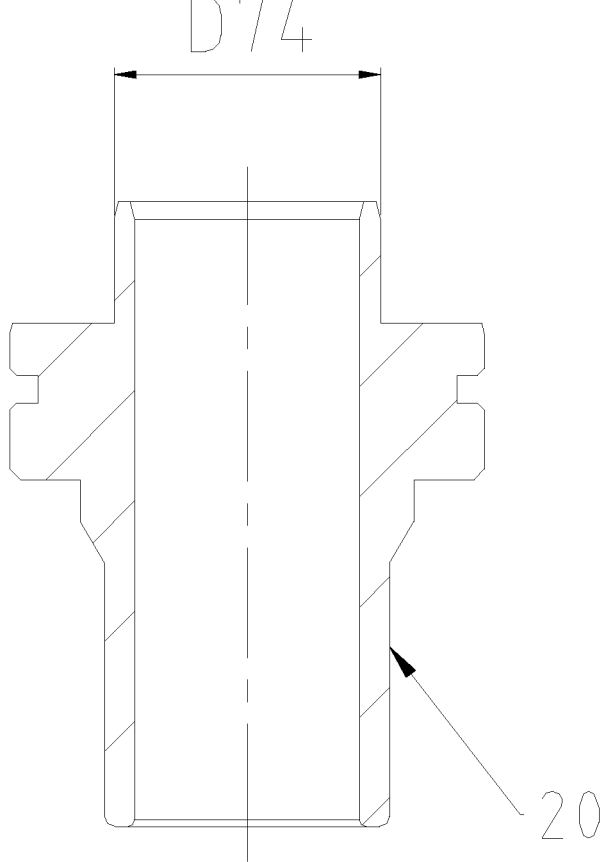

FIG. 25 illustrates a schematic structure diagram of a guide sleeve in FIG. 22.

Figure 26:
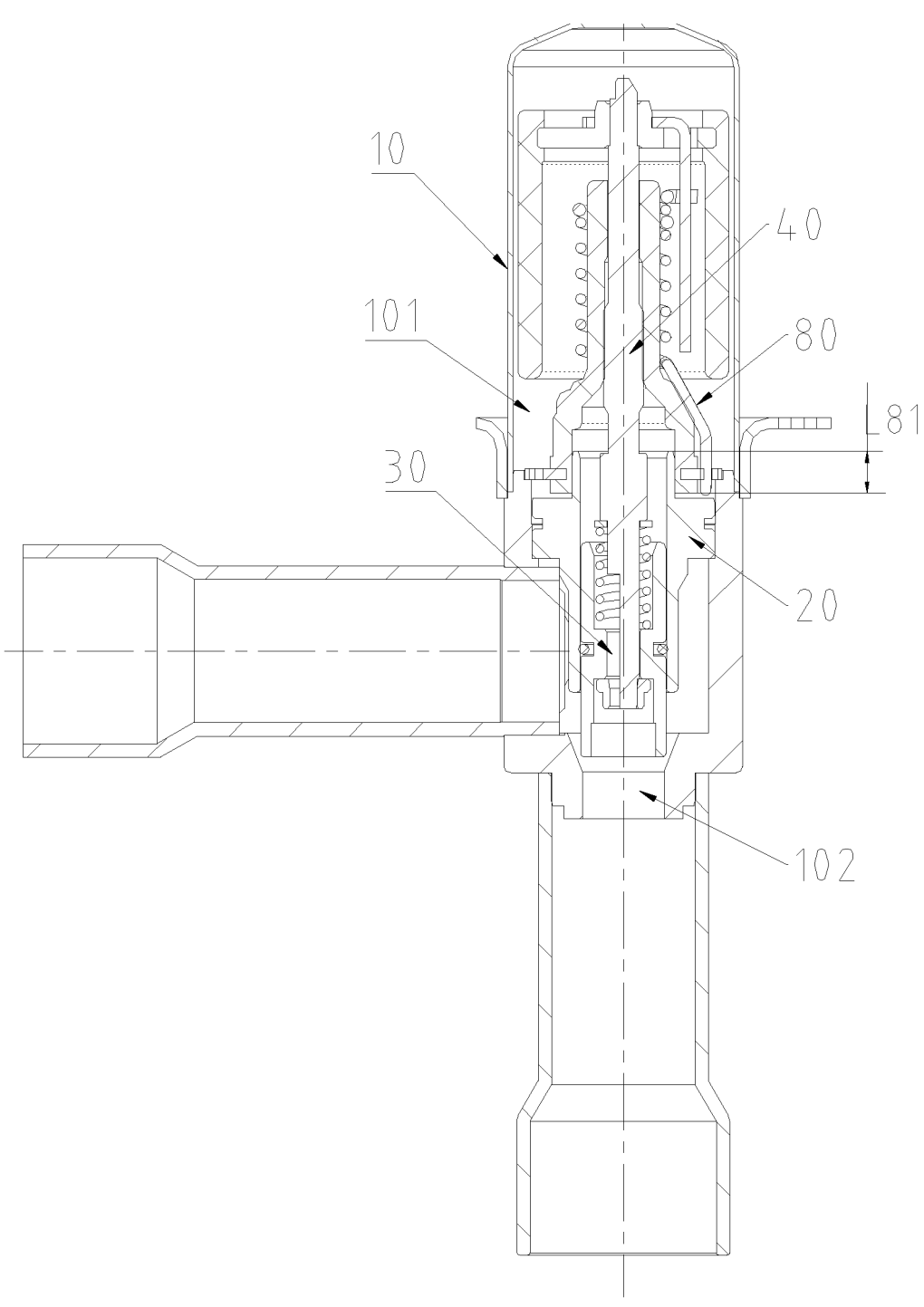

FIG. 26 illustrates a schematic structure diagram of an electronic expansion valve provided by the present disclosure.

Figure 27:
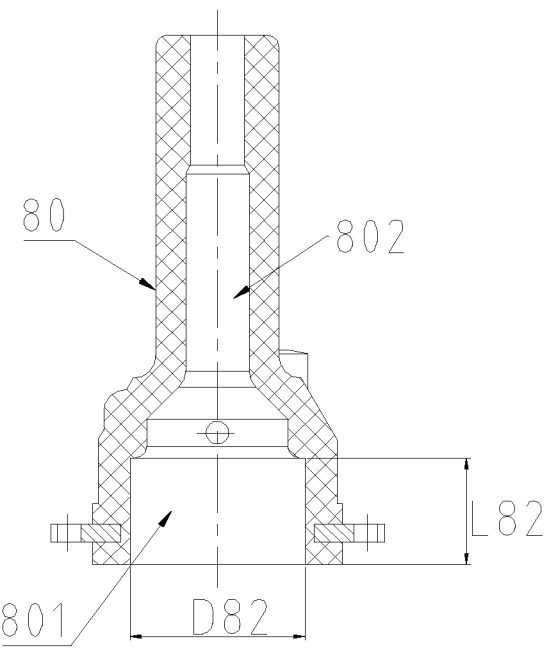

FIG. 27 illustrates a schematic structure diagram of a nut sleeve in FIG. 26.

Figure 28:
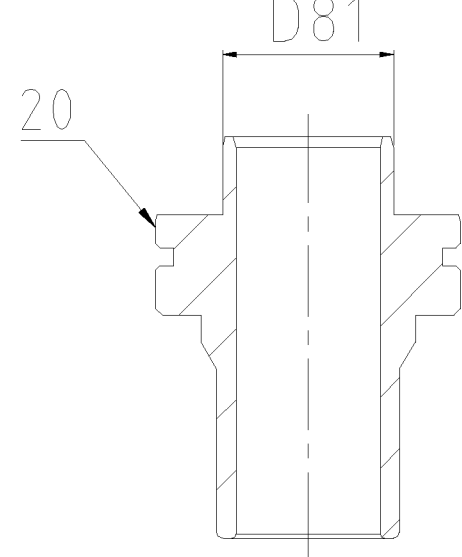

FIG. 28 illustrates a schematic structure diagram of a guide sleeve in FIG. 26.

The drawings include the following reference signs.

10. Valve body;

101. Accommodating cavity;

102. Valve port; 1021. First conical hole section; 1022. Straight hole section; 1023. Second conical hole section;

103. First opening; 1031. Connecting pipe; 104. Second opening;

11. Valve seat; 1101. Valve cavity; 11011. First mounting section; 11012. Second mounting section;

12. Shell; 121. Mounting cavity;

111. First hole section; 112. Second hole section;

20. Guide sleeve; 201. Guide hole;

21. Connecting section; 211. First connecting section; 212. Second connecting section;

22. Guide section;

23. Welding ring groove;

24. First cylindrical section; 25. Buffer section; 26. Second cylindrical section;

30. Valve head; 301. First end; 302. Second end;

31. First communicating hole;

311. First section; 312. Transition section; 313. Second section; 3101. First through hole; 3102. Second through hole;

32. Second communicating hole;

33. Third communicating hole;

331. Third through hole; 332. Fourth through hole;

40. Screw; 41. First rod section; 42. Second rod section; 43. Third rod section; 44. Section structure;

50. Valve sleeve; 51. First connecting hole; 52. Annular groove;

60. Spring;

70. Seal ring;

80. Nut sleeve; 81. Annular mounting plate; 801. Second guide hole; and 802. Second connecting hole.

DETAILED DESCRIPTION OF THE EMBODIMENTS

The technical solutions in the embodiments of the present disclosure will be clearly and completely described below in combination with the drawings in the embodiments of the present disclosure. It is apparent that the described embodiments are not all embodiments but part of embodiments of the present disclosure. The following description for at least one exemplary embodiment is merely illustrative in nature and is in no way intended to limit the present disclosure, its application, or uses. All other embodiments obtained by those of ordinary skill in the art based on the embodiments of the present disclosure without creative efforts shall fall within the protection scope of the present disclosure.

As shown in FIG. 1, an embodiment of the present disclosure provides an electronic expansion valve, which includes a valve body 10, a guide sleeve 20 and a valve head 30. The valve body 10 has an accommodating cavity 101 and a valve port 102, and the valve port 102 communicates with the accommodating cavity 101. The guide sleeve 20 is disposed in the accommodating cavity 101. The valve head 30 is movably disposed in the guide sleeve 20 and the valve head 30 is configured for blocking or opening the valve port 102, and a balance channel is disposed in the valve head 30 so as to enable two ends of the valve head 30 are communicated. The valve head 30 has a first end 301 and a second end 302 which are oppositely disposed, the first end 301 is configured for blocking the valve port 102, a refrigerant medium and the first end 301 have a first stress area S1, the refrigerant medium and the second end 302 have a second stress area S2, and $-1.3 \text{ mm}^2 \leq S1-S2 \leq 1.3 \text{ mm}^2$.

By adoption of the technical solution of the present disclosure, the first stress area and the second stress area are limited in the above range, so that when the refrigerant medium flows into the accommodating cavity 101 from the valve port 102 through the balance channel, the pressures of the refrigerant medium in the accommodating cavity 101 to the first end 301 and the second end 302 of the valve head 30 are the same. By setting S1 and S2 in the above range, S1 and S2 are close to each other, so that after the electronic expansion valve is closed, pressures applied to the first end 301 and the second end 302 of the valve head 30 are close to each other, then only friction force needs to be overcome during the opening and closing processes of the valve head 30, therefore, the action performance of the valve head 30 assembly is ensured, and the reliability of action of the electronic expansion valve is improved.

As shown in FIG. 1 and FIG. 2, the valve head 30 has a first communicating hole 31, a second communicating hole 32 and a third communicating hole 33 sequentially communicated along a direction from the first end 301 to the second end 302, an aperture of the first communicating hole 31 and an aperture of the third communicating hole 33 are greater than an aperture of the second communicating hole 32. The electronic expansion valve further includes: a screw 40 and a valve sleeve 50, the screw 40 is movably disposed in the accommodating cavity 101, and an end of the screw 40 sequentially passes through the third communicating hole 33 and the second communicating hole 32 and extends into the first communicating hole 31; the valve sleeve 50 is located in the first communicating hole 31, and is fixedly connected with the end part of the screw 40, a step face formed by the first communicating hole 31 and the second communicating hole 32 carries out axial limit on the valve sleeve 50, a first gap is formed between the screw 40 and the second communicating hole 32, a second gap is formed between the screw 40 and the valve sleeve 50, the first gap and the second gap are communicated to form the balance channel, and the first communicating hole 31 and the third communicating hole 33 are communicated through the balance channel; an end face area of the first end 301 is S11, an area of the step face formed by the first communicating hole 31 and the second communicating hole 32 is S12, and S1 is a sum of S11 and S12; an end face area of the second end 302 is S21, an area of a step face formed by the third communicating hole 33 and the second communicating hole 32 is S22, and S2 is a sum of S21 and S22. Through the above design, the first stress area includes S11 and S12, and the second stress area includes S21 and S22, so that when the electronic expansion valve is designed, S11 and S21 may be enabled to be close as much as possible, S12 and S22 may be enabled to be close as much as possible, and finally, S1 and S2 are enabled to be close as much as possible.

In some embodiments, a notch is disposed in a peripheral surface of the screw 40, the notch extends towards a direction of the valve port 102, and the notch enables the first gap to be formed between the screw 40 and the second communicating hole 32. A flow hole is formed in the valve sleeve 50, the flow hole extends along an axial direction of the valve sleeve 50, an end, with the notch, of the screw 40 is disposed in the flow hole in a penetrating manner and fixedly matched with the valve sleeve 50, and the notch enables the second gap to be formed between the screw 40 and the flow hole. Through the above arrangement, it may ensure that the first gap and the second gap are located on a same side of the screw 40, so that the first gap and the second gap are matched to form the balance channel, and it also facilitates fixed matching of the screw 40 and the valve sleeve 50.

In some embodiments an outer diameter of a part, corresponding to the first communicating hole 31, of the valve head 30 is D1, an outer diameter of the part, corresponding to the third communicating hole 33, of the valve head 30 is D2, D1=D2; and the aperture of the first communicating hole 31 is d1, the aperture of the third communicating hole 33 is d2, and −1 mm≤d1−d2≤1 mm. By setting d1 and d2 in the above range, S12 and S22 are close as much as possible, and further, S1 and S2 are close as much as possible. In some embodiments, d1 and d2 may have the following relationships: d1−d2=−1 mm, d1=d2, and d1−d2=1 mm.

In some embodiments, a chamfer R1 is disposed on a peripheral surface of an end part of the first end 301, and R0.04 mm≤R1≤R0.8 mm. When the electronic expansion valve is in the blocked state, the peripheral surface of the end, with the chamfer R1, of the first end 301 is matched with the valve port 102 so as to realize blocking for the valve port 102. When R1<0.04 mm, it is not convenient for processing and forming of the chamfer, and meanwhile, after a long time of use, the chamfer is easy to wear, thus shortening the service life of the valve head 30; and when R1>0.8 mm, when the electronic expansion valve is closed, a distance from a contact position of the valve head 30 and the valve port 102 to a peripheral surface of the valve head 30 is too large, resulting in a too large difference between S11 and S21. Therefore, in the embodiment, by setting R1 in the above range, the convenience of chamfering processing may be ensured, the service life of the valve head 30 may be ensured, and too large difference between S11 and S12 also may be avoided. In some embodiments, R1 may be set to 0.04 mm, 0.1 mm, 0.2 mm, 0.4 mm, and 0.8 mm.

In some embodiments, the first communicating hole 31 includes a first through hole 3101 and a second through hole 3102 disposed in a step, an aperture of the first through hole 3101 is greater than that of the second through hole 3102, the first through hole 3101 is disposed close to the valve port 102, a stepped face is disposed between the first through hole 3101 and the second through hole 3102, an area of the stepped face is S10, and S1 is a sum of S10, S11 and S12; and/or, the third communicating hole 33 includes a third through hole 331 and a fourth through hole 332 sequentially communicated, the fourth through hole 332 is a conical hole, an aperture of the fourth through hole 332 gradually increases towards a direction away from the valve port 102, a stress area of the fourth through hole 332 is S20, and S2 is a sum of S20, S21 and S22. In some embodiments the aperture of the second through hole 3102 is d1, and an aperture of the third through hole 331 is d2. In the solution, shapes of two ends of the valve head 30 are similar, in this way, a worker may distinguish two end parts of the valve head 30, and further may assemble the valve head 30. Meanwhile, the above setting has little influence on a difference value between the first stress area S1 and the second stress area S2.

In some embodiments, a chamfer R3 is disposed on a peripheral surface of an end part of the second end 302. In some embodiments, R0.2 mm≤R3≤R1.3 mm. In some embodiments, R=0.2 mm, 0.5 mm, 1 mm, or 1.3 mm. Due to setting of R3, it may avoid burrs at the end part of the second end 302, thus ensuring smooth movement of the valve head 30.

In the embodiment, D1=D2, d1=d2, R1=R0.04 mm, in this way, the difference value between the first stress area and the second stress area is within 1.3 mm, so that the difference between pressures applied to two ends of the valve head 30 may be reduced, and the reliability of action of the electronic expansion valve may be ensured.

As shown in FIG. 3 and FIG. 4, the electronic expansion valve of the present disclosure may also be disposed as: an outer diameter of the first end 301 is greater than that of the second end 302, a difference value between the outer diameter of the first end 301 and the outer diameter of the second end 302 is smaller than or equal to 4 mm, and a difference value between the aperture of the first communicating hole 31 and the aperture of the third communicating hole 33 is −1 mm to 1 mm. In the solution, the difference value between the outer diameter of the first end 301 and the outer diameter of the second end 302 and the difference value between the aperture of the first communicating hole 31 and the aperture of the third communicating hole 33 are cooperatively set in the above range, so that the difference value between S1 and S2 may be reduced as much as possible. In some embodiments, the outer diameter of the first end 301 is D11, the aperture of the first communicating hole 31 is d11, the outer diameter of the second end 302 is D12, the aperture of the third communicating hole 33 is d12, and D11, D12, d11 and d12 may have following relations: D11−D12=0.5 mm, d11−d12=−1 mm, or D11−D12=1.5 mm, d11=d12; or D11−D12=4 mm, d11−d12=1 mm.

In some embodiments, a chamfer R2 is disposed on a peripheral surface of an end part of the first end 301, and 0.04 mm≤R2≤53 mm. When R2<0.04 mm, it is not convenient for processing and forming of the chamfer, and meanwhile, after a long time of use, the chamfer is easy to wear, thus shortening the service life of the valve head 30; and when R2>3 mm, when the electronic expansion valve is closed, the distance from the contact position of the valve head 30 and the valve port 102 to the peripheral surface of the valve head 30 is too large, resulting in the too large difference between S11 and S21. Therefore, in the embodiment, by setting R2 in the above range, the convenience of chamfering processing may be ensured, the service life of the valve head 30 may be ensured, and too large difference between S11 and S12 also may be avoided. In some embodiments, R2 may be set to 0.04 mm, 1 mm, 2 mm, or 3 mm.

In some embodiments, a part, corresponding to the first communicating hole 31, of the valve head 30 has a first section 311, a transition section 312 and a second section 313 sequentially connected along the direction from the first end 301 to the second end 302, an outer diameter of the second section 313 is smaller than that of the first section 311, and an outer diameter of the transition section 312 gradually decreases along a direction from the first section 311 to the second section 313. In this way, it may avoid a step structure on the peripheral surface of the valve head 30, further, the smoothness of the peripheral surface of the valve head 30 may be ensured, and meanwhile, processing and forming of the valve head 30 may also be facilitated.

In the embodiment, D11−D12=1.5 mm, d11=d12, and R2=R1 mm. In this way, the difference value between the first stress area and the second stress area is within 1.3 mm, so that the difference between pressures applied to two ends of the valve head 30 is reduced, and the reliability of action of the electronic expansion valve is ensured.

As shown in FIGS. 1 and 5, the electronic expansion valve of the embodiment of the present disclosure includes: a valve body 10, a valve head 30, a screw 40 and a valve sleeve 50. The valve body 10 has a valve port 102, the valve head 30 is movably disposed in the valve body 10, the valve head 30 may block or open the valve port 102, the valve head 30 has a first communicating hole 31, a second communicating hole 32 and a third communicating hole 33 sequentially communicated along an axial direction, the first communicating hole 31 is disposed close to the valve port 102, a diameter of the second communicating hole 32 is smaller than those of the first communicating hole 31 and the third communicating hole 33, the screw 40 is disposed in the valve head 30 in a penetrating manner, the screw 40 has a first rod section 41 and a second rod section 42 sequentially disposed along the axial direction, a section structure 44 is disposed on a side wall of the screw 40, the section structure 44 extends to a tail end of the second rod section 42 from a middle of the first rod section 41, a balance channel is disposed between the section structure 44 and the valve head 30, the valve sleeve 50 is located in the first communicating hole 31, the valve sleeve 50 has a first connecting hole 51, the second rod section 42 is connected with the first connecting hole 51, a first gap is disposed between the section structure 44 and the first connecting hole 51, a diameter of the first connecting hole 51 is D3, a maximum value of the first gap is L1, and 0.5*D3>L1>0.1*D3.

When L1>0.5*D3, the maximum value of the first gap may be increased, which will reduce a welding strength between the valve sleeve 50 and the screw 40, so that a connection between the valve sleeve 50 and the screw 40 fails, affecting a structural strength of the valve sleeve 50 and the screw 40 after welding; and when L1<0.1D3, the maximum value of the first gap may be reduced, and a flow of a medium passing through the first gap will also be reduced, thus affecting a balance speed of the balance channel. Therefore, in the present disclosure, the maximum value L1 of the first gap is set as 0.5*D3>L1>0.1*D3, so that the balance speed of the balance channel is ensured, and the work efficiency of the apparatus is improved. In some embodiments, L1 may be 0.2*D3, 0.3*D3 or 0.4*D3.

By disposing the structure, the valve head 30 is movably disposed in the valve body 10, the screw 40 is disposed in the valve head 30 in a penetrating manner, so that the valve head 30 may block or open the valve port 102 of the valve body 10, meanwhile, the screw 40 is connected with the first connecting hole 51 in the valve sleeve 50 in a penetrating manner, the section structure 44 is disposed on the side wall of the screw 40, the balance channel is formed between the section structure 44 and the valve head 30, so that the processing difficulty of the balance channel is reduced, and a size of the balance channel is simplified; meanwhile, the first gap is formed between the section structure 44 and the first connecting hole 51, the diameter of the first connecting hole 51 is set as D3, the maximum value of the first gap is set as L1, and 0.5*D3>L1>0.1*D3, so that the processing difficulty of the balance channel is reduced, the size of the balance channel is simplified, by utilizing the range, the balance speed of the balance channel is ensured, and the work efficiency of the apparatus is improved.

As shown in FIGS. 6 and 7, a cross section area of the first gap is S, and S≥0.8 mm². Through the above arrangement, an effective balance area may be provided, thus further ensuring the balance speed of the balance channel. In some embodiments, S may be 0.8 mm², 0.9 mm² or 1.0 mm².

In some embodiments, an axial length of the section structure 44 is L2, a second gap is disposed between the section structure 44 and the second communicating hole 32, and a sum of the axial lengths of the first gap and the second gap is L3, and L2≥1.3*L3. In this way, the length of the balance channel along the axial direction is prolonged, so that the medium may reach an upper end of the valve head 30 more rapidly after passing through the first gap, so as to further improve the balance speed of the balance channel. A value of L2 may be 1.3*L3, 1.4*L3, or 1.5*L3.

In some embodiments, the second gap is larger than the first gap. In this way, a larger flow space may be provided for the medium, which is beneficial for the medium to pass through the second gap more rapidly after passing through the first gap, thus improving the flow efficiency of the apparatus.

In some embodiments, a distance between an end, away from the valve sleeve 50, of the section structure 44 and the upper end face of valve head 30 is L4, L4≤3 mm. In this way, it may further ensure that the medium continues to flow along the gap between the first section and the first communicating hole after passing through the balance channel, so that a time for the medium to reach the upper end of the valve head 30 is shortened, further improving the balance speed of the apparatus. The value of L4 may be 3 mm, 2 mm or 1 mm.

In some embodiments, the screw 40 further has a third rod section 43, the third rod section 43 is connected with an end, away from the valve port 102, of the first rod section 41, a diameter of the third rod section 43 is greater than that of the first rod section 41, a distance between an end, away from the valve sleeve 50, of the section structure 44 and an end, close to the valve port 102, of the third rod section 43 is L5, and L5≥2*D3. In this way, it is beneficial for guiding the screw 40 when the apparatus operates, and meanwhile, the diameter of the third rod section 43 is set to be greater than that of the first section, which may ensure the stability when the apparatus operates. Wherein, the value of L5 may be 2*D3, 3*D3, or 4*D3.

In some embodiments, the diameter of the first rod section 41 is greater than that of the second rod section 42. In this way, it is beneficial for increasing the structural strength of a lower section of the screw 40, thus ensuring the work performance when the apparatus operates.

In some embodiments, the electronic expansion valve further includes a spring 60, which sleeves on the screw 40, a first end of the spring 60 abuts against a stepped face between the third communicating hole 33 and the second communicating hole 32, and a second end of the spring 60 abuts against a stepped face between the first rod section 41 and the third rod section 43. In this way, the valve head 30 may block the valve port 102 without other external forces.

Through the technical solution provided by the present disclosure, the valve head 30 is movably disposed in the valve body 10, the screw 40 is disposed in the valve head 30 in a penetrating manner, so that the valve head 30 may block or open the valve port 102 of the valve body 10, meanwhile, the screw 40 is connected with the first connecting hole 51 in the valve sleeve 50 in a penetrating manner, the section structure 44 is disposed on the side wall of the screw 40, the balance channel is formed between the section structure 44 and the valve head 30, so that the processing difficulty of the balance channel may be reduced, and the size of the balance channel may be simplified; meanwhile, the first gap is formed between the section structure 44 and the first connecting hole 51, the diameter of the first connecting hole 51 is set as D3, the maximum value of the first gap is set as L1, and 0.5*D3>L1>0.1*D3, so that the processing difficulty of the balance channel may be reduced, the size of the balance channel may be simplified, by utilizing the range, the balance speed of the balance channel may be ensured, and the work efficiency of the apparatus may be improved. Meanwhile, the spring 60 sleeves the screw 40, in this way, the valve head 30 may block the valve port 102 without other external forces.

As shown in FIG. 1, and FIGS. 8-10, an electronic expansion valve provided by an embodiment of the present disclosure includes a valve body 10, a guide sleeve 20, a valve head 30 and a seal ring 70. The valve body 10 has an accommodating cavity 101, a valve port 102 is disposed on the valve body 10, the valve port 102 communicates with the accommodating cavity 101, and the valve port 102 is configured for fluid flow. The guide sleeve 20 is disposed in the accommodating cavity 101, the guide sleeve 20 is fixedly connected to the valve body 10, and a first guide hole 201 is formed in the guide sleeve 20. The valve head 30 is movably disposed in the first guide hole 201 in a penetrating manner, and the valve head 30 is configured for blocking the valve port 102. The first guide hole 201 is configured for guiding the valve head 30 so that the valve head 30 may accurately block the valve port 102. An annular groove 52 is formed in an outer side wall of the valve head 30, the annular groove 52 and the valve head 30 are coaxially disposed, and the seal ring 70 is disposed between the first guide hole 201 and the annular groove 52. The seal ring 70 is configured to seal a gap between the first guide hole 201 and the valve head 30, so as to prevent fluid from entering an upper portion of the guide sleeve 20 to cause damage or corrosion to components of the electronic expansion valve, and prevent the valve head 30 from moving.

An outer diameter of the seal ring 70 is D32, a diameter of the first guide hole 201 is D31, D32 is set to be greater than D31, and a difference value between D32 and D31 is set to be 0.1 mm-0.5 mm. If the outer diameter D32 of the seal ring 70 is smaller than the diameter D31 of the first guide hole 201, the gap between the first guide hole 201 and the valve head 30 cannot be fully sealed by the seal ring 70, so the outer diameter D32 of the seal ring 70 is set to be greater than the diameter D31 of the first guide hole 201, and then the gap between the first guide hole 201 and the valve head 30 may be completely sealed. If the difference value between D32 and D31 is smaller than 0.1 mm, the sealing effect between the guide sleeve and the valve sleeve is not good, if the difference value between D32 and D31 is greater than 0.5 mm, a mutual extrusion force between the seal ring and the guide sleeve is larger, resulting in a greater friction force between the seal ring and the guide sleeve, and then the seal ring is easy to wear, therefore, the difference value between D32 and D31 is set to 0.1 mm-0.5 mm, so that the sealing effect between the guide sleeve and the valve sleeve is good, meanwhile, the seal ring is not easy to wear, so that the service life of the seal ring is prolonged.

By adoption of the technical solution of the present disclosure, the annular groove 52 is formed in the outer side wall of the valve head 30, the seal ring 70 is disposed between the first guide hole 201 and the annular groove 52, so that the seal ring 70 may be stably kept between the first guide hole 201 and the valve head 30; the difference value between D32 and D31 is set to 0.1 mm-0.5 mm, so that the sealing effect between the guide sleeve 20 and the valve head 30 is good, meanwhile, the seal ring 70 is not easy to wear, so that the service life of the seal ring 70 is prolonged. In addition, there is friction force between the seal ring 70 and the guide sleeve 20 and the valve head 30, which prevents the valve head 30 from moving relative to the guide sleeve 20.

As shown in FIGS. 8-10, in some embodiments, an inner diameter of the annular groove 52 is D34, an inner diameter of the seal ring 70 is D35, and a difference value of D34 and D35 is –0.5 mm to 0.5 mm. If D34–D35 is smaller than –0.5 mm, a gap between the annular groove 52 and the seal ring 70 is large, then the seal ring 70 is easy to be extruded to deform by an inner wall of the first guide hole 201, so that the seal ring 70 cannot tightly attach to the guide sleeve 20 or the annular groove 52, resulting in poor sealing of the seal ring 70; if D34–D35 is greater than 0.5 mm, the seal ring 70 and the annular groove 52 extrude each other, so that the seal ring 70 is in a tensioning state all the time, and the seal ring 70 is easy to fatigue, which will shorten the service life of the seal ring 70; therefore, the difference value between D34 and D35 is –0.5 mm to 0.5 mm, which enables the sealing of the seal ring 70 to be better and ensures long service life of the seal ring 70.

In the embodiment, a width of the annular groove 52 is L31, a diameter of a cross section of the seal ring 70 is D33, and L31 is 1.1 to 1.4 times a size of D33. If L31 is smaller than 1.1 times of D33, there is no enough space to accommodate the seal ring 70 in the annular groove 52 when the seal ring 70 and the guide sleeve 20 extrude each other, so that when the valve head 30 moves along the guide sleeve 20, the seal ring 70 is easily detached from the annular groove 52; if L31 is greater than 1.4 times of D33, the space in the annular groove 52 is too large, and when the valve head 30 moves along the guide sleeve 20, the seal ring 70 also displaces relative to the annular groove 52, so that there is friction force between the seal ring 70 and the annular groove 52 and the guide sleeve 20, and the seal ring 70 is easy to wear; therefore, by setting L31 to be 1.1 to 1.4 times of D33, the seal ring 70 is stably disposed in the annular groove 52, and the seal ring 70 also may be prevented from being excessively worn.

In some embodiments, the outer diameter D32 of the seal ring 70 is set to be 6.5 mm-8.5 mm. Since the difference value between D32 and D31 is 0.1 mm-0.5 mm, the diameter D31 of the first guide hole 201 is 6 mm-8.4 mm. If D31 is smaller than 6 mm, the processing of the first guide hole 201 is relatively complicated. If D31 is greater than 8.4 mm, a structural size of the guide sleeve 20 is large, resulting in a reduction in a space of the accommodating cavity 101, which in turn reduces fluid flow. Therefore, by disposing D31 to be 6 mm-8.4 mm, the first guide hole 201 is easy to process, and the structural size of the guide sleeve 20 is also small. In some embodiments, D32 may be set to 6.5 mm, 7.5 mm or 8.5 mm; and D31 may be 6 mm, 7 mm or 8.4 mm.

In some embodiments, the diameter D33 of the cross section of the seal ring 70 is 0.5 mm-1 mm. If the diameter D of the cross section of the seal ring 70 is smaller than 0.5 mm, a size of the seal ring 70 is small, resulting in difficult processing and poor wear resistance; if the diameter D of the cross section of the seal ring 70 is greater than 1 mm, the processing of the seal ring 70 requires more raw materials, and the cost is high; therefore, by setting the diameter D33 of the cross section of the seal ring 70 to 0.5 mm-1 mm, the processing of the seal ring 70 is facilitated, and raw materials are also saved. In some embodiments, D33 may be 0.5 mm, 0.75 mm, or 1 mm.

In the embodiment, the annular groove 52 is located in a middle of the valve head 30. The annular groove 52 is disposed in the middle of the valve head 30, so that a structural strength of the valve head 30 and the annular head 52 may be ensured, meanwhile, by disposing the annular groove 52 in the middle of the valve head 30, a possibility that the seal ring 70 escapes from the annular groove 52 may also be reduced.

A distance from a center line, vertical to an axis, of the annular groove 52 to an end part of the valve head 30 is L32, and L32 is 35% to 65% of a length L33 of the valve head 30. When L32 is smaller than 35% of L33 or L32 is greater than 65% of L33, the annular groove 52 is close to an edge of the valve head 30, and the annular groove 52 is prone to cause poor structural strength of the valve head 30. Therefore, by setting L32 to be 35% to 65% of L33, the structural strength of the valve head 30 is high. In some embodiments, L32 may be 50% of L33.

The distance L32 from the center line, vertical to the axis, of the annular groove 52 to the end part of the valve head 30 is 6.5 mm-8 mm. If L32 is smaller than 6.5 mm, an overall length of the valve head 30 is small, which is not beneficial for product processing and flow control. If L32 is greater than 8 mm, the valve head 30 is relatively long as a whole, so that a structural size of the valve body 10 is large, which increases the cost of the product. Therefore, by setting L32 to 6.5 mm-8 mm, the structural strength of the valve head 30 may be ensured, and meanwhile, flow may also be conveniently controlled. In some embodiments, L32 may be 6.5 mm, 7.5 mm, or 8 mm.

By adoption of the technical solution of the present disclosure, the annular groove 52 is formed in the outer side wall of the valve head 30, the seal ring 70 is disposed between the first guide hole 201 and the annular groove 52, so that the seal ring 70 may be stably kept between the first guide hole 201 and the valve head 30; the difference value between D32 and D31 is set to 0.1 mm-0.5 mm, so that the sealing effect between the guide sleeve 20 and the valve head 30 is good, and meanwhile, the seal ring 70 is not easy to wear; the inner diameter of the annular groove 52 is D34, the inner diameter of the seal ring 70 is D35, and the difference value of D34 and D35 is −0.5 mm to 0.5 mm, so that the sealing of the seal ring 70 is good, and the service life of the seal ring 70 is long; the width of the annular groove 52 along the axial direction is L31, the diameter of the cross section of the seal ring 70 is D33, L31 is 1.1 to 1.4 times of D33, so that the seal ring 70 may be stably disposed in the annular groove 52, and the seal ring 70 also may be prevented from being excessively worn.

As shown in FIGS. 11 and 12, the present disclosure provides an electronic expansion valve, which includes a valve body 10, the valve body includes a valve seat 11, and the electronic expansion valve further includes a valve head 30. The valve seat 11 has a valve cavity 1101 and a valve port 102, the valve port 102 has a first conical hole section 1021, a straight hole section 1022 and a second conical hole section 1023 which are connected sequentially, a diameter of an end part, away from the straight hole section 1022, of the first conical hole section 1021 is greater than that of an end part, connected with the straight hole section 1022, of the first conical hole section 1021, a diameter of an end part, away from the straight hole section 1022, of the second conical hole section 1023 is greater than that of an end part, connected with the straight hole section 1022, of the second conical hole section 1023, a length of the straight hole section 1022 is L41, a conical angle of the second conical hole section 1023 is A4, the length L41 of the straight hole section 1022 is 0.5 mm-1.5 mm, a conical angle A4 of the second conical hole section 1023 is 20°-60°, the valve head 30 is movably disposed in the valve cavity 1101, and the valve head 30 has a blocking position for blocking the valve port 102 and an opening position for opening the valve port 102.

When the length L41 of the straight hole section 1022 is greater than 1.5 mm and the conical angle A4 of the second conical hole section 1023 is smaller than 20°, the flow of fluid flowing through the valve port 102 may be increased; when the length L41 of the straight hole section 1022 is smaller than 0.5 mm and the conical angle A4 of the second conical hole section 1023 is greater than 60°, the flow of fluid flowing through the valve port 102 may be reduced, both the two settings above may reduce flow coefficient of the valve port 102, thus increasing a pressure loss of fluid when flowing through the valve port 102, and meanwhile correspondingly reducing an internal leakage prevention performance of the apparatus. Therefore, in the present disclosure, the length L41 of the straight hole section 1022 is set to 0.5 mm-1.5 mm, the conical angle A4 of the second conical hole section 1023 is set to 20°-60°, the length L41 of the straight hole section 1022 may be reduced by setting the second conical hole section 1023, a lower end of the straight hole section 1022 is replaced with a conical angle face, in this way, a flow resistance between fluid and an inner wall of the valve port 102 are reduced when the fluid flows on the valve port 102, the pressure loss when the fluid flows through the valve port 102 is reduced, further, the flow coefficient of the valve port 102 is effectively improved, in some embodiments, the length L41 of the straight hole section 1022 may be 0.5 mm, 1 mm or 1.5 mm, and the conical angle A4 of the second conical hole section 1023 may be 20°, 50° or 60°.

Through the above structure, the valve port 102 is disposed as a three-section structure including the first conical hole section 1021, the straight hole section 1022 and the second conical hole section 1023 which are sequentially connected, meanwhile, the length L41 of the straight hole section 1022 is set to 0.5 mm-1.5 mm, the conical angle A4 of the second conical hole section 1023 is set to 20°-60°, so that the flow coefficient of the valve port 102 is effectively improved, the pressure loss when the fluid flows through the valve port 102 is reduced, meanwhile, the internal leakage prevention performance of the apparatus may be improved, and the stability of the apparatus in the operation process is ensured.

In some embodiments, the valve head 30 has a first outer side wall, which is matched with an inner wall of the first conical hole section 1021 to block the valve port 102, a diameter of the first outer side wall is D41, and D41 is 5 mm-8 mm. In this way, the valve head 30 is simple in structure and convenient to process, the production cost is saved, meanwhile, the diameter D41 of the first outer side wall is set to 5 mm-8 mm, so that mounting of electronic extension valves of different sizes may be met, thus correspondingly improving the applicability of the valve head 30, in some embodiments, the diameter D41 of the first outer side wall may be 5 mm, 6 mm, or 8 mm.

As shown in FIG. 13, a diameter of the straight hole section 1022 is D42, and D41−D42≥0.2 mm. In this way, when the valve head 30 is sealed with the valve port 102, it may ensure that the valve head 30 fully covers a periphery of the straight hole section 1022, so that the sealing of the apparatus is more reliable, and the value of D41−D42 may be 0.2 mm, 0.5 mm or 0.7 mm.

In some embodiments, a conical angle of the first conical hole section 1021 is greater than that of the second conical hole section 1023. In this way, the straight hole section 1022 may adapt to valve heads 30 of different specifications, so that when the straight hole section 1022 is connected with the valve head 30 in a matched manner, it is convenient for the straight hole section 1022 to adjust the flow of fluid flowing from the valve seat 11, so as to facilitate the apparatus in controlling the flow of the fluid.

In some embodiments, the conical angle of the first conical hole section 1021 is B4, and a value of B4 is 25°-65°. In this way, more selectable angles are provided for the conical angle of the first conical hole section 1021, thus increasing an adjusting range of the first conical hole section 1021 for flow, meanwhile, it is also more convenient for the apparatus to control flow, in some embodiments, the conical angle B4 of the first conical hole section 1021 may be 25°, 30° or 65°.

In some embodiments, a maximum diameter of the first conical hole section 1021 is greater than that of the second conical hole section 1023. In this way, it is beneficial for increasing a flow space of the fluid at a position, close to the valve cavity 1101, of the valve port 102, thereby increasing a maximum flow area of the apparatus.

In some embodiments, a maximum diameter of the first conical hole section 1021 is D43, a value of D43 is 6 mm-9.5 mm, a maximum diameter of the second conical hole section 1023 is D44, and a value of D44 is 7 mm-8.5 mm. In this way, the flow resistance of the flow when flowing through the valve port 102 may be reduced while flow of the fluid is adjusted, so that the operation efficiency of the apparatus may be improved, and the maximum diameter D42 of the straight hole section 1022 may be 6 mm, 7 mm or 9.5 mm.

In some embodiments, the electronic expansion valve further includes a guide sleeve 20, the guide sleeve 20 is fixed on the valve seat 11, a part of the guide sleeve 20 is located in the valve cavity 1101, and the valve head 30 is movably disposed in the guide sleeve 20. Through above arrangement, the guide sleeve 20 is fixedly connected with the valve seat 11, in this way, the valve head 30 may be guided through the guide sleeve 20, so that the valve head 30 stably moves along the axial direction.

In some embodiments, the valve seat 11 further includes a first hole section 111 and a second hole section 112 disposed in a step along the axis, a first end of the second hole section 112 is connected with the first hole section 111, a second end of the second hole section 112 is connected with the valve cavity 1101, a diameter of the first hole section 111 is greater than that of the second hole section 112, and the guide sleeve 20 is in transitional fit with the second hole section 112. Through the above structure, the guide sleeve 20 may be fixedly connected with the valve seat 11, so as to prevent displacement of the guide sleeve 20 when the apparatus operates, thus ensuring the stability when the apparatus operates.

Through the above structure, the valve port 102 is disposed as a three-section structure including the first conical hole section 1021, the straight hole section 1022 and the second conical hole section 1023 which are sequentially connected, meanwhile, the length L41 of the straight hole section 1022 is set to 0.5 mm-1.5 mm, the conical angle A4 of the second conical hole section 1023 is set to 20°-60°, so that the flow coefficient of the valve port 102 is effectively improved, pressure loss when the fluid flows through the valve port 102 is reduced, meanwhile, the internal leakage prevention performance of the apparatus is improved, and the stability of the apparatus in the operation process is ensured; meanwhile, the guide sleeve 20 is fixedly connected with the valve seat 11, so as to prevent displacement of the guide sleeve 20 when the apparatus operates, thus ensuring the stability when the apparatus operates.

As shown in FIGS. 14-18, the electronic expansion valve provided by the present disclosure includes a valve body 10, and the valve body 10 includes a valve seat 11. The valve seat 11 has a first hole section 111, a second hole section 112 and a valve cavity 1101 which are sequentially connected along an axis, the valve port 102 is disposed on the valve seat 11, the valve port 102 is connected with an end, away from the second hole section 112, of the valve cavity 1101, a diameter of the second hole section 112 is smaller than that of the first hole section 111, the guide sleeve 20 is fixedly disposed on the valve seat 11, the guide sleeve 20 has a connecting section 21 and a guide section 22 which are connected with each other along the axis, the connecting section 21 is disposed corresponding to the first hole section 111 and the second hole section 112, the guide section 22 is located in the valve cavity 1101, a welding ring groove 23 is annularly disposed on an outer side wall of the connecting section 21, a diameter of the first hole section 111 is D51, a diameter of the connecting section 21 is D53, and 0.1 mm≥D51−D53≥0.02 mm.

When D51−D53≤0.02, a gap between the first hole section 111 and the connecting section 21 may be reduced, so that an area of a welding ring entering the gap is reduced, and the welding quality is further reduced; when D51−D53≥0.1 mm, the gap between the first hole section 111 and the connecting section 21 may be increased, so that the assembly and welding of the guide sleeve 20 and the valve seat 11 are not facilitated, and the welding ring needs to be added for ensuring the welding quality, thereby increasing the production cost. Therefore, in the present disclosure, the value of D51−D53 is set 0.02 mm-0.1 mm, thus ensuring the welding quality. In some embodiments, the value of D51−D53 may be 0.02 mm, 0.05 mm, or 0.1 mm.

Through the above structure, the diameter of the first hole section 111 is set to be greater than the diameter of the connecting section 21, so that the gap is formed between the first hole section 111 and the connecting section 21, the gap between the two is set to be 0.02 mm-0.1 mm, a welding seam may be formed between the connecting section 21 and the first hole section 111 through the gap, further, when welding is carried out, the welding ring in the welding ring groove 23 may be conveniently melted to enter the welding seam, so that the welding reliability of the guide sleeve 20 and the valve seat 11 may be improved, and the guide sleeve 20 and the valve seat 11 are more tightly matched and firmer after being welded.

In some embodiments, the connecting section 21 and the second hole section 112 are in interference fit. Through the arrangement, the position of the connecting section 21 on the valve seat 11 may be limited by using the second hole section 112, so as to facilitate the locating of the guide sleeve 20 during installation, thereby improving the stability of the apparatus after assembly.

In some embodiments, a diameter of the second hole section 112 is D52, and 0.05 mm≥D53−D52≥0 mm. The distance between the two is set to 0 mm-0.05 mm, so that the locating effect of the valve seat 11 on the guide sleeve 20 may be further improved, meanwhile, the guide sleeve 20 may be conveniently placed in the second hole section 112 during installation, and the assembly stability of the apparatus is improved through the limit of the range. A value of D53−D52 may be 0 mm, 0.02 mm or 0.05 mm.

In some embodiments, the diameter of the second hole section 112 is D52, and D51−D52≥0.02 mm. The diameter of the first hole section 111 is set to be greater than that of the second hole section 112, and the first hole section 111 and the second hole section 112 are disposed in a step shape, which is beneficial for guiding the guide sleeve 20 by the valve seat 11 in the installation process, and is convenient for installing the guide sleeve 20, thereby improving the assembly efficiency. In some embodiments, the value of D51−D52 may be 0.02 mm, 0.04 mm, or 0.06 mm.

In some embodiments, the connecting section 21 has a first connecting section 211 and a second connecting section 212, the weld ring groove 23 is located between the first connecting section 211 and the second connecting section 212, the second connecting section 212 is located in the second hole section 112, a height of the second connecting section 212 is L51, a height of the second hole section 112 is L52, a distance between an end, close to the valve port 102, of the first connecting section 211 and an end, close to the valve port 102, of the connecting section 21 is L53, and L53>L52>L51. Through the above arrangement, a non-closed welding seam structure may be constructed, the welding ring is convenient to fill, and the welding ring is located among the first hole section 111, the second hole section 112, the first connecting section 211 and the second connecting section 212 through the structure, so that the welding quality of the valve seat 11 and the guide sleeve 20 may be improved.

In some embodiments, L51≥21 mm. In this way, the guide sleeve may be stably fixed in the valve body, and the effective connection between the guide sleeve and the valve body may be ensured, which is beneficial for further improving the welding quality of the seat 11 and the guide sleeve 20. A value of L51 may be 1 mm, 2 mm or 3 mm.

As shown in FIG. 17, a height of the first connecting section 211 is L54, and L54≥0.5 mm. Through the above arrangement, an effective welding length of the valve body and guide sleeve 20 may be ensured, so as to further improve the quality of the valve body and guide sleeve 20 after welding, and also improve the structural strength of the apparatus after welding. In some embodiments, a value of L54 may be 0.5 mm, 0.8 mm, or 0.9 mm.

As shown in FIG. 18, the electronic expansion valve further includes: a shell 12, a nut sleeve 80 and a screw 40. The shell 12 is connected with the valve seat 11, and a mounting cavity 121 is provided between the shell 12 and the valve seat 11; the nut sleeve 80 is disposed in the mounting cavity 121; the screw 40 is movably disposed in the mounting cavity 121, the screw 40 is disposed on the nut sleeve 80 in a penetrating manner, and is in threaded connection with the nut sleeve 80; a valve head 30 is movably disposed in the guide sleeve 20, the valve head 30 is in driving connection with the screw 40, the screw 40 is configured to drive the valve head 30 to open or block the valve port 102. The valve head 30 moves between opening and closing positions, then the mounting cavity 121 may be communicated with the valve cavity 1101, thus ensuring the stability of the apparatus during operation.

Through the technical solution provided by the present disclosure, the diameter of the first hole section 111 is set to be greater than the diameter of the connecting section 21, so that a gap is formed between the first hole section 111 and the connecting section 21, the gap between the two is set to be 0.02 mm-0.1 mm, a welding seam may be formed between the connecting section 21 and the first hole section 111 through the gap, further, when welding is carried out, a welding ring in the welding ring groove 23 may be conveniently melted to enter the welding seam, so that the welding reliability of the guide sleeve 20 and the valve seat 11 may be improved, and the guide sleeve 20 and the valve seat 11 are more tightly matched and firmer after being welded, meanwhile, the valve head 30 moves between opening and closing positions, then the mounting cavity 121 may be communicated with the valve cavity 1101, thus ensuring the stability of the apparatus during operation.

As shown in FIG. 19, an electronic expansion valve provided by an embodiment of the present disclosure includes a valve body 10 and a guide sleeve 20. The valve body 10 has an accommodating cavity 101, a first opening 103 is disposed on a side wall of the valve body 10, a second opening 104 is disposed at a bottom end of the valve body 10, a valve port 102 is disposed on the valve body 10, the valve port 102 and the second opening 104 are coaxially disposed, and the second opening 104 communicates with the accommodating cavity 101 through the valve port 102; the guide sleeve 20 is disposed on the accommodating cavity 101, the guide sleeve 20 is fixedly connected on the valve body 10, the guide sleeve 20 and the valve port 102 are coaxially disposed, the guide sleeve 20 includes a connecting section 21, a first cylindrical section 24, a buffer section 25 and a second cylindrical section 26 which are sequentially connected, the connecting section 21 is configured for being fixedly connected with the valve body 10, the second cylindrical section 26 is disposed close to the valve port 102, a diameter of the second cylindrical section 26 is smaller than that of the first cylindrical section 24, and a diameter of the buffer section 25 decreases gradually in a direction from the first cylindrical section 24 to the second cylindrical section 26. The diameter of the buffer section 25 decreases gradually, when fluid flows to a side wall of the guide sleeve 20, an impact force on the fluid may be reduced by using the buffer section 25, and the fluid may be guided by the buffer section 25. The buffer section 25 may be a conical structure with an inclined outer wall, or a conical structure with a curved outer wall, or it may be formed by sequentially connecting a plurality of sequentially decreasing step sections.

By adoption of the technical solution of the present disclosure, the guide sleeve 20 includes the connecting section 21, the first cylindrical section 24, the buffer section 25 and the second cylindrical section 26 which are sequentially connected, the second cylindrical section 26 is disposed close to the valve port 102, the diameter of the buffer section 25 decreases gradually in a direction from the first cylindrical section 24 to the second cylindrical section 26, by disposing the buffer section 25, the impact force suffered by fluid when the fluid flows to the outer side wall of the guide sleeve 20 from the first opening 103 may be reduced, meanwhile, the buffer section 25 may guide the fluid, so that the fluid flows towards the direction of the second opening 104 along the side wall of the guide sleeve 20, thus increasing a flow of the fluid per unit time. Moreover, the diameter of the second cylindrical section 26 is smaller than the diameter of the first cylindrical section 24, so that a flow space in the accommodating cavity 101 may be increased, and the flow of the fluid per unit time of the electronic expansion valve may be further increased.

As shown in FIG. 21, in some embodiments, the diameter of the first cylindrical section 24 is D61, the diameter of the second cylindrical section 26 is D62, and D61−D62≥1 mm. If D61−D62≤1 mm, the diameter of the second cylindrical segment 26 is large, so that the space of the accommodating cavity is reduced, that is, the space for fluid flow is small, and flow of the fluid per unit time of the electronic expansion valve may be reduced. Therefore, D61−D62≥1 mm, the flow space in the electronic expansion valve may be increased, thus increasing the flow of the fluid per unit time of the electronic expansion valve. In some embodiments, D61−D62 may be 1 mm, or 2 mm.

As shown in FIG. 20, in some embodiments, the buffer section 25 is a conical section, a conical angle of the buffer section 25 is δ, and δ is 30°-90°. If δ is smaller than 30°, an inclined angle of the side of the buffer section 25 is small, so the guiding effect of the buffer section 25 is weakened. If δ is greater than 90°, the inclined angle of the buffer section 25 is large, a length of the buffer section 25 is small, so the buffer effect of the buffer section 25 is weakened. Therefore, by disposing δ to 30°–90°, the buffer section 25 has a good buffering effect and guiding effect. In some embodiments, δ may be 20°, 50° or 90°.

In the embodiment, a diameter of a first end, close to the valve port 102, of the conical section is equal to that of the second cylindrical section 26, and a diameter of a second end, away from the valve port 102, of the conical section is equal to that of the first cylindrical section 24. In this way, an outer surface of the guide sleeve 20 is continuously smooth, so that the impact force of the fluid when flowing to the guide sleeve 20 may be reduced, thus increasing the flow of the fluid.

As shown in FIG. 20, in the embodiment, the electronic expansion valve also includes a connecting pipe 1031, the connecting pipe 1031 is connected with the first opening 103, a bottom end of the guide sleeve 20 is higher than a bottom end of an inner wall of the connecting pipe 1031, a distance between the bottom end of the inner wall of the connecting pipe 1031 and the bottom end of the guide sleeve 20 is L61, and L61 is greater than or equal to 1 mm. If L61 is smaller than 1 mm, the guide sleeve 20 shields an opening of the connecting pipe 1031 to a great extent, resulting in a reduced flow of fluid flowing from the connecting pipe 1031 to the second opening 104, so that when L61 is greater than or equal to 1 mm, the flow of fluid of the electronic expansion valve may be increased. In some embodiments, L61 may be 1 mm, 2 mm, or 3 mm.

In some embodiments, in a radial direction of the connecting pipe 1031, a bottom end face of the guide sleeve 20 is disposed close to an axis of the connecting pipe 1031. In this way, the length of the guide sleeve 20 may be ensured to meet the requirements, and a shielding part of the opening of the connecting pipe 1031 is small, so as to increase the flow of flow of the electronic expansion valve.

In some embodiments, an end, away from the valve port 102, of the buffer section 25 is higher than a top end of the inner wall of the connecting pipe 1031. In this way, a diameter of a part, directly facing the connecting pipe 1031, of the guide sleeve 20 is small, then a shielding range of the opening of the connecting pipe 1031 by the guide sleeve 20 may be reduced, and thus the flow of the fluid is large.

As shown in FIG. 20, in the embodiment, a distance between the end, away from the valve port 102, of the buffer section 25 and the top end of the inner wall of the connecting pipe 1031 is L62, and L62 is greater than or equal to 1 mm. If L62 is smaller than 1 mm, the diameter of the part, directly facing the connecting pipe 1031, of the buffer section 25 is large, so that large part of the opening of the connecting pipe 1031 is shielded, therefore, if L62 is greater than or equal to 1 mm, the shielding range of the opening of the connecting pipe 1031 is small, and the flow of the fluid of the electronic expansion valve per unit time is large. In some embodiments, L62 may be 1 mm, 2 mm, or 2.5 mm.

As shown in FIG. 21, in the embodiment, a diameter D61 of the first cylindrical section 24 is 8.5 mm-13 mm. A valve head 30 is movably disposed in the guide sleeve 20, the valve head 30 is configured to block or open the valve port 102, if the diameter D61 of the first cylindrical section 24 is smaller than 8.5 mm, the inner diameter of the guide sleeve 20 is small, a diameter of the valve head 30 is small, and then the valve head 30 cannot meet the requirement of blocking the valve port 102. If the diameter of the first cylindrical section 24 is greater than 13 mm, a structural size of the guide sleeve 20 is large, so that a structural size of the valve body 10 is large. Therefore, when the diameter D61 of the first cylindrical section 24 is set to 8.5 mm-13 mm, it is ensured that the valve head 30 meets the requirements, meanwhile, the structure of the valve body 10 is compact, and a space occupied by the electronic expansion valve is saved. In some embodiments, D61 may be 8.5 mm, 11 mm, or 13 mm.

As shown in FIG. 20, in some embodiments, a diameter of the inner wall of the connecting pipe 1031 is D63, and D63 is 8 mm-14 mm. If D63 is smaller than 8 mm, the inner diameter of the connecting pipe 1031 is small, so that the flow of fluid of the electronic expansion valve is small. If D63 is greater than 14 mm, the inner diameter of the connecting pipe 1031 is large, so that the volume of the electronic expansion valve is large. Therefore, by setting the range of D63 to 8 mm-14 mm, it may ensure that the flow of fluid of the electronic expansion valve is large, and it also may ensure that the structure of the electronic expansion valve is compact. In some embodiments, D63 may be 8 mm, 12 mm, or 14 mm.

By adoption of the technical solution of the present disclosure, the second cylindrical section 26 is disposed close to the valve port 102, the diameter of the buffer section 25 decreases gradually in a direction from the first cylindrical section 24 to the second cylindrical section 26, by disposing the buffer section 25, the impact force suffered by fluid when the fluid flows to the guide sleeve 20 from the first opening 103 is small, meanwhile, the buffer section 25 may guide the fluid, so that the fluid flows towards the direction of the second opening 104 along the guide sleeve 20, thus increasing the flow of the fluid of the electronic expansion valve per unit time; the diameter of the second cylindrical section 26 is smaller than the diameter of the first cylindrical section 24, the diameter of the second cylindrical section 26 is small, so that the space in the accommodating cavity 101 is increased, the flow space of fluid is large, further increasing flow of fluid of the electronic expansion valve per unit time; the diameter of the first cylindrical section 24 is D61, the diameter of the second cylindrical section 26 is D62, D61–D62≥1 mm, so that the flow space of the fluid in the electronic expansion valve is large, and it is ensured that the flow of fluid of the electronic expansion valve per unit time is large.

As shown in FIGS. 22-24, an embodiment of the present disclosure provides an electronic expansion valve, which includes a valve body 10 and a nut sleeve 80. The valve body 10 has a valve cavity 1101 and a valve port 102, the valve cavity 1101 communicates with the valve port 102, the valve cavity 1101 includes a first mounting section 11011 and a second mounting section 11012 disposed in a step, and an inner diameter of the first mounting section 11011 is greater than that of the second mounting section 11012. The first mounting section 11011 and the second mounting section 11012 are disposed on the inner wall of the valve cavity 1101, and the first mounting section 11011 and the second mounting section 11012 are integrated with the valve body 10. An annular mounting plate 81 is disposed on a periphery of the nut sleeve 80, the annular mounting plate 81 is located in the first mounting section 11011, the annular mounting plate 81 is in welding connection with an inner wall of the first mounting section 11011, and the annular mounting plate 81 and a side face of the first mounting section 11011 are in clearance fit. An end, close to the valve port 102, of the nut sleeve 80 has a second guide hole 801, the electronic expansion valve also includes a guide sleeve 20, the guide sleeve 20 is partially located in the valve cavity 1101, the guide sleeve 20 is located at the end, close to the valve port 102, of the nut sleeve 80, an end, away from the valve port 102, of the guide sleeve 20 extends into the second guide hole 801, the guide sleeve 20 and the nut sleeve 80 are coaxially disposed, and the guide sleeve 20 and the second guide hole 801 are in interference fit. Through the structure, a good coaxiality may be maintained between the guide sleeve 20 and the nut sleeve 80. The nut sleeve 80 and the guide sleeve 20 are fixedly connected, so that when the annular mounting plate 81 is welded, the nut sleeve 80 and the valve body 10 may be guided and located through a match of the guide sleeve 20 and the second guide hole 801 to further improve the coaxiality of the guide sleeve 20 and the nut sleeve 80, meanwhile, by utilizing the above structure for locating, the influence on the coaxiality when the annular mounting plate 81 and the first mounting section 11011 are welded may be reduced. In some embodiments, the annular mounting plate 81 and the nut sleeve 80 may be split structures and also may be configured as an integrated structure. The annular mounting plate 81 is lapped on a stepped face between the first mounting section 11011 and the second mounting section 11012 to enhance the stability of the annular mounting plate 81.

By adoption of the technical solution of the present disclosure, the annular mounting plate 81 and the first mounting section 11011 are in clearance fit, the guide sleeve 20 and the nut sleeve 80 are coaxially disposed and are in interference fit, when the annular mounting plate 81 is welded, the nut sleeve 80 and the valve body 10 may be guided and located through the match of the guide sleeve 20 and the second guide hole 801 to further improve the coaxiality of the two, meanwhile, when the first mounting section 11011 and the annular mounting plate 81 are welded together, the annular mounting plate 81 has a deformation margin when heated, thus reducing the possibility that the annular mounting plate 81 warps from the first mounting section 11011, thereby ensuring a good coaxiality between the nut sleeve 80 and the valve body 10.

In the embodiment, the inner diameter of the first mounting section 11011 is D71, an outer diameter of the annular mounting plate 81 is D72, and D71–D72 is 0.02 mm-0.08 mm. If D71–D72 is smaller than 0.02 mm, the gap between the annular mounting plate 81 and the first mounting section 11011 is too small, the annular mounting plate 81 is prone to warping due to heating deformation during welding, if D71–D72 is greater than 0.08 mm, the gap between the annular mounting plate 81 and the first mounting section 11011 is too large, when the annular mounting plate 81 and the first mounting section 11011 are welded, the operation is difficult and the coaxiality is poor. Therefore, when D71–D72 is set to 0.02 mm-0.08 mm, the welding difficulty of the annular mounting plate 81 and the first mounting section 11011 may be reduced, meanwhile, the annular mounting plate 81 is not prone to warping due to deformation, and the two maintain a good coaxiality.

As shown in FIG. 25, in some embodiments, an inner diameter of the second guide hole 801 is D73, an outer diameter of an end, away from the valve port 102, of the guide sleeve 20 is D74, and 0≤D74–D73≤0.1 mm. If D74–D73 is smaller than 0, the guide sleeve 20 and second guide hole 801 are in clearance fit, so that when the annular mounting plate 81 is welded, the match between guide sleeve 20 and second guide hole 801 cannot guide and locate the nut sleeve 80 and valve body 10. If D74–D73 is greater than 0.1 mm, the guide sleeve 20 is difficult or cannot be installed in the second guide hole 801, therefore, when D74–D73 is set to be greater than or equal to 0 and smaller than or equal to 0.1 mm, it may enable the guide sleeve 20 and the second guide hole 801 to be in interference fit, then when the annular mounting plate 81 is welded, the coaxiality of valve body 10 and nut sleeve 80 may be improved by matched guide and locating of the guide sleeve 20 with the second guide hole 801, meanwhile, the guide sleeve 20 may be easily installed in the second guide hole 801. In some embodiments, D74–D73 may be 0, 0.03 mm or 0.06 mm, or 0.1 mm.

In some embodiments, 6.5 mm≤D74≤8 mm. Through the above solution, 6.44 mm≤D73≤8 mm. In the embodiment, D74 may be 6.5 mm, 7 mm or 8 mm; and D73 may be 6.44 mm, 6.95 mm or 8 mm.

In the embodiment, a thickness of the annular mounting plate 81 is L71, a height of the first mounting section 11011 is L72, and L71 is greater than L72. The nut sleeve 80 is generally made of a plastic material. L71 is set to be greater than L72, so that the first mounting section 11011 may reflect laser in a direction away from the nut sleeve 80 during welding, thus avoiding a problem of deformation of the nut sleeve 80 due to heating that caused by the laser irradiates on the nut sleeve 80.

In some embodiments, the thickness L71 of the annular mounting plate 81 is 0.3 mm-1.2 mm. If L71 is smaller than 0.3 mm, the structural strength of the annular mounting plate 81 is small, and the nut sleeve 80 cannot be stably supported by the annular mounting plate 81; if L71 is greater than 1.2 mm, the annular mounting plate 81 occupies a large space, resulting in a large volume of the valve body 10, therefore, L71 is set to 0.3 mm-1.2 mm, so that the structural strength of the nut sleeve 80 may be higher, and meanwhile, the annular mounting plate 81 occupies a small space. In some embodiments L71 may be 0.3 mm, 0.6 mm, 1 mm, or 1.2 mm.

In some embodiments, the inner diameter D71 of the first mounting section 11011 is 13 mm-15 mm. D71 may be 13 mm, 14 mm or 15 mm.

In the embodiment, the valve body 10 includes a valve seat 11 and a shell 12, a valve cavity 1101 and a valve port 102 are disposed on the valve seat 11, the valve cavity 1101 is located at a first end of the valve seat 11, the valve port 102 is located at a second end of the valve seat 11, the shell 12 is connected with the first end, where the valve cavity 1101 is located, of the valve seat 11, and the shell 12 covers outside the nut sleeve 80. The first mounting section 11011 and the second mounting section 11012 are disposed at an end, away from the valve port 102, of the valve cavity 1101, the second mounting section 11012 and the inner wall of the valve cavity 1101 are located on the same side, a groove with a cross section being a L shape is disposed at the end, way from the valve port 102, of the inner wall of the valve cavity 1101, and the groove is disposed to form the first mounting section 11011 and the second mounting section 11012.

In the embodiment, the nut sleeve 80 further has a second connecting hole 802 communicating with the second guide hole 801, the second connecting hole 802 is located at an end, away from the valve port 102, of the second guide hole 801, the second connecting hole 802 and the second guide hole 801 are coaxially disposed, the electronic expansion valve further includes a screw 40, and the screw 40 is disposed in the nut sleeve 80 in a penetrating manner and is in threaded connection with the second connecting hole 802. The second connecting hole 802 is a threaded hole, the screw 40 is in threaded connection with the second connecting hole 802, and the screw 40 moves in a straight line along the second connecting hole 802 when rotating.

In the embodiment, the electronic expansion valve further includes a valve head 30, the valve head 30 is movably disposed in the guide sleeve 20, the valve head 30 is fixedly connected with an end, close to the valve port 102, of the screw 40, and the screw 40 drives the valve head 30 to move to block or open the valve port 102. The screw 40, the valve head 30 and the valve port 102 are coaxially disposed. The screw 40 moves in the straight line along the second connecting hole 802 when rotating, the screw 40 drives the valve head 30 to move in the straight line, and the valve head 30 blocks or opens the valve port 102.

By adoption of the technical solution of the present disclosure, the annular mounting plate 81 and the first mounting section 11011 are in clearance fit, then when the first mounting section 11011 and the annular mounting plate 81 are welded together, the annular mounting plate 81 has a deformation margin when heated, thus reducing the possibility that the annular mounting plate 81 warps from the first mounting section 11011, thereby ensuring a good coaxiality between the nut sleeve 80 and the valve body 10; when D71−D72 is set to 0.02 mm-0.08 mm, the welding difficulty of the annular mounting plate 81 and the first mounting section 11011 may be reduced, meanwhile, the annular mounting plate 81 is not prone to warping due to deformation, and the two maintain a good coaxiality; the guide sleeve 20 and the second guide hole 801 are in interference fit, namely, the nut sleeve 80 and the guide sleeve 20 are fixedly connected, so that when the annular mounting plate 81 is welded, the nut sleeve 80 and the valve body 10 may be guided and located through the match of the guide sleeve 20 and the second guide hole 801 to further improve the coaxiality of the two, meanwhile, by utilizing the above structure for locating, the influence on the coaxiality when the annular mounting plate 81 and the first mounting section 11011 are welded may be reduced, so that the coaxiality between the nut sleeve 80 and the valve body 10 may be ensured; the thickness of the annular mounting plate 81 is L71, the height of the first mounting section 11011 is L72, L71 is set to be greater than L72, so that during welding, the first mounting section 11011 may reflect laser outwards, thus avoiding a problem of deformation of the nut sleeve 80 due to heating that caused by the laser irradiates on the nut sleeve 80.

As shown in FIGS. 26 and 28, an embodiment of the present disclosure provides an electronic expansion valve, which includes a valve body 10, a nut sleeve 80 and a guide sleeve 20. An accommodating cavity 101 and a valve port 102 are disposed in the valve body 10, and the valve port 102 communicates with the accommodating cavity 101; the nut sleeve 80 is disposed in the accommodating cavity 101, the nut sleeve 80 is fixedly connected on the valve body 10, and a second guide hole 801 is disposed at an end, close to the valve port 102, of the nut sleeve 80; the guide sleeve 20 is disposed in the accommodation cavity 101, the guide sleeve 20 is fixedly connected on the valve body 10, the top of the guide sleeve 20 extends into the second guide hole 801, the second guide hole 801 and the guide sleeve 20 are in interference fit, a length, extending into the second guide hole 801, of the guide sleeve 20 is L81, a diameter of a part, extending into the second guide hole 801, of the guide sleeve 20 is D81, and L81≥D81/3. L81≥D81/3, namely, a length-diameter ratio of the part, extending into the second guide hole 801, of the guide sleeve 20 is greater than ⅓, so that the connection stability between the guide sleeve 20 and the nut sleeve 80 may be enhanced. In some embodiments, L81 may be 5*D81/12 or D81/3.

By adoption of the technical solution, the guide sleeve 20 and the second guide hole 801 are in interference fit, so that the locating reliability of the guide sleeve 20 and the nut sleeve 80 is high; the second guide hole 801 is disposed in the nut sleeve 80, the length, extending into the second guide hole 801, of the guide sleeve 20 is L81, the diameter of the part, extending into the second guide hole 801, of the guide sleeve 20 is D81, L81≥D81/3, namely, the length-diameter ratio of a matched part of the guide sleeve 20 and a fixing hole 1 is greater than or equal to ⅓, the length-diameter ratio of the matched part of the guide sleeve 20 and the second guide hole 801 is large, so that the locating reliability between the guide sleeve 20 and the nut sleeve 80 may be further improved, further, the coaxiality among a screw assembly, a valve element assembly and the valve port 102 may be enhanced, thus reducing internal leakage of the electronic expansion valve.

As shown in FIG. 27, in the embodiment, a length of the second guide hole 801 is L82, and L81≤0.9*L82. During an assembly process of the electronic expansion valve, first, the guide sleeve 20 needs to be mounted on the valve body 10, then the second guide hole 801 of the nut sleeve 80 is connected with the guide sleeve 20 in interference fit, finally, the nut sleeve 80 is welded on the valve body 10, if the length L81, extending into the second guide hole 801, of the guide sleeve 20 is greater than 0.9*L82, a gap between the guide sleeve 20 and the second guide hole 801 in an axial direction is too small, which may cause interference between the guide sleeve 20 and the nut sleeve 80 during the assembly process of the electronic expansion valve, resulting in failure of mounting the nut sleeve 80 on the valve body 10. Therefore, by setting L81 to be smaller than or equal to 0.9*L82, interference between the guide sleeve 20 and the nut sleeve 80 during assembly of the electronic expansion valve may be prevented. In some embodiments, L81 may be 0.8*L82, 0.6*L82, or 0.9*L82.

In some embodiments, a diameter of the second guide hole 801 is D82, and 0≤D81−D82≤0.1 mm. If D81−D82 is smaller than 0, the second guide hole 801 and the guide sleeve 20 are in clearance fit, and the guide sleeve 20 and the nut sleeve 80 are not fixedly connected, thus reducing the locating reliability between the guide sleeve 20 and the nut sleeve 80. If D81−D82 is greater than 0.1 mm, the guide sleeve 20 is difficult to be mounted into the second guide hole 801. Therefore, when 0≤D81−D82≤0.1 mm, the second guide hole 801 and the guide sleeve 20 are in interference fit, the locating reliability between the guide sleeve 20 and the nut sleeve 80 may be improved, and meanwhile, the guide sleeve 20 may be rapidly and conveniently mounted in the second guide hole 801. In some embodiments, D81−D82 may be 0, 0.03 mm, or 0.1 mm.

In the embodiment, the electronic expansion valve further includes a screw 40, a second connecting hole 802 is disposed in the nut sleeve 80, the screw 40 is in threaded connection with the second connecting hole 802, the second guide hole 801 is disposed at the end, close to the valve port 102, of the nut sleeve 80, and the second guide hole 801 communicates with the second connecting hole 802. The screw 40 is in threaded connection with the second connecting hole 802, when the screw 40 rotates around the second connecting hole 802, the screw 40 moves in a straight line along an axis of the second connecting hole 802, and a matched structure of the screw 40 and the second connecting hole 802 may realize accurate locating when the screw 40 moves.

In the embodiment, the electronic expansion valve further includes a valve head 30, the valve head 30 is movably disposed in the guide sleeve 20, the valve head 30 and the valve port 102 are coaxially disposed, and the valve head 30 is configured to block or open the valve port 102. The guide sleeve 20 guides the valve head 30 to prevent the valve head 30 from being tilted, so that the valve head 30 may accurately block or open the valve port 102.

In the embodiment, the screw 40 and the valve head 30 are coaxially disposed, an end, close to the valve port 102, of the screw 40 is fixedly connected with the valve head 30, and the screw 40 drives the valve head 30 to move to block or open the valve port 102. Accurate locating may be realized when the screw 40 drives the valve head 30 to move, thus a degree of opening the valve port 102 by the valve head 30 may be accurately controlled, and therefore, the flow of the electronic expansion valve may be accurately controlled.

In some embodiments, 6.5 mm≤D81≤8 mm. If D81 is smaller than 6.5 mm, an inner diameter of the guide sleeve 20 is small, the valve head 30 is movably disposed in the guide sleeve 20, that is, the diameter of the valve head 30 is also small, and then the valve head 30 cannot meet the requirement of blocking the valve port 102. If D81 is greater than 8 mm, because L81≥D81/3, L81 is greater than 8/3 mm, so that lengths of the nut sleeve 80 and the guide sleeve 20 are large, and then an overall volume of the electronic expansion valve is large, which is not beneficial for an overall miniaturization design of the electronic expansion valve. Therefore, if 6.5 mm≤D81≤8 mm, the diameter of the valve head 30 may meet the requirement of blocking the valve port 102, and meanwhile, the structure of the electronic expansion valve is compact. In some embodiments, D81 may be 6.5 mm, 7 mm, or 8 mm.

In some embodiments, 3 mm≤L82≤5 mm. If L82 is smaller than 3 mm, the length of the second guide hole 801 is small, the length-diameter ratio of the part, extending into the second guide hole 801, of the guide sleeve 20 is small, so that the connection stability between the guide sleeve 20 and the nut sleeve 80 is poor. If L82 is greater than 5 mm, the length of the second guide hole 801 is large, so that an overall length of the nut sleeve 80 is large, which is not beneficial for the overall miniaturization design of the electronic expansion valve. Therefore, when 3 mm≤L82≤5 mm, the length-diameter ratio of the part, extending into the second guide hole 801, of the guide sleeve 20 is large, and meanwhile, the structure of the electronic expansion valve is compact. In some embodiments, L82 may be 3 mm, 4 mm, or 5 mm.

By adoption of the technical solution, the guide sleeve 20 and the second guide hole 801 are in interference fit, the guide sleeve 20 and the nut sleeve 80 are fixedly connected, so that the locating reliability of the guide sleeve 20 and the nut sleeve 80 is high; the second guide hole 801 is disposed in the nut sleeve 80, the length, extending into the second guide hole 801, of the guide sleeve 20 is L81, the diameter of the part, extending into the second guide hole 801, of the guide sleeve 20 is D81, L81≥D81/3, namely, the length-diameter ratio of the matched part of the guide sleeve 20 and the second guide hole 801 is greater than or equal to ⅓, the length-diameter ratio of the matched part of the guide sleeve 20 and the second guide hole 801 is large, so that the locating reliability between the guide sleeve 20 and the nut sleeve 80 may be further improved, further, the structural stability of the screw assembly and a valve element assembly may be enhanced. The length of the second guide hole 801 is L82, L81≤0.9*L82, and then interference between the guide sleeve 20 and the nut sleeve 80 during assembly of the electronic expansion valve may be prevented.

The foregoing is merely some embodiments of the present disclosure and is not intended to limit the present disclosure, and various modifications and variations of the present disclosure may be available for those skilled in the art. Any modifications, equivalent replacements, improvements and the like made within the spirit and principle of the present disclosure shall fall within the scope of protection of the present disclosure.

What is claimed is:

1. An electronic expansion valve, comprising:
   a valve body, wherein the valve body has an accommodating cavity and a valve port, and the valve port communicates with the accommodating cavity;
   a guide sleeve, which is disposed in the accommodating cavity;
   a valve head, which is movably disposed in the guide sleeve, the valve head is configured for blocking or opening the valve port, and a balance channel is disposed in the valve head so as to enable two ends of the valve head to be communicated;
   wherein the valve head has a first end and a second end which are oppositely disposed, the first end is configured for blocking the valve port, the valve head has a first communicating hole, a second communicating hole and a third communicating hole sequentially communicated along a direction from the first end to the second end, an aperture of the first communicating hole and an aperture of the third communicating hole are greater than an aperture of the second communicating hole, an end face area of the first end is S11, an area of a step face formed by the first communicating hole and the second communicating hole is S12, and S1 is a sum of S11 and S12; an end face area of the second end is S21, an area of a step face formed by the third communicating hole and the second communicating hole is S22, and S2 is a sum of S21 and S22, and −1.3 mm²≤S1−S2≤1.3 mm².

2. The electronic expansion valve as claimed in claim 1, wherein the electronic expansion valve further comprises: a screw, the screw is movably disposed in the accommodating cavity, and an end of the screw sequentially passes through the third communicating hole and the second communicating hole and extends into the first communicating hole; a valve sleeve, which is located in the first communicating hole, and is fixedly connected with an end part of the screw, the step face formed by the first communicating hole and the second communicating hole carries out an axial limit on the valve sleeve, a first gap is formed between the screw and the second communicating hole, a second gap is formed between the screw and the valve sleeve, the first gap and the second gap are communicated to form the balance channel, and the first communicating hole and the third communicating hole are communicated through the balance channel.

3. The electronic expansion valve as claimed in claim 2, wherein an outer diameter of a part, corresponding to the first communicating hole, of the valve head is D1, an outer diameter of the part, corresponding to the third communicating hole, of the valve head is D2, and D1=D2; and the aperture of the first communicating hole is d1, the aperture of the third communicating hole is d2, and −1 mm≤d1−d2≤1 mm; wherein a chamfer R1 is disposed on a peripheral surface of an end part of the first end, and R0.04 mm≤R1≤R0.8 mm.

4. The electronic expansion valve as claimed in claim 2, wherein an outer diameter of the first end is greater than an outer diameter of the second end, a difference value between the outer diameter of the first end and the outer diameter of the second end is smaller than or equal to 4 mm, and a difference value between the aperture of the first communicating hole and the aperture of the third communicating hole is-1 mm to 1 mm; wherein a chamfer R2 is disposed on a peripheral surface of an end part of the first end, and R0.04 mm≤R2≤R3 mm.

5. The electronic expansion valve as claimed in claim 4, wherein a part, corresponding to the first communicating hole, of the valve head has a first section, a transition section and a second section sequentially connected along the direction from the first end to the second end, an outer diameter of the second section is smaller than an outer diameter of the first section, and an outer diameter of the transition section gradually decreases along a direction from the first section to the second section.

6. The electronic expansion valve as claimed in claim 2, wherein the first communicating hole comprises a first through hole and a second through hole disposed in a step, the aperture of the first through hole is greater than an aperture of the second through hole, the first through hole is disposed close to the valve port, a stepped face is disposed between the first through hole and the second through hole, an area of the stepped face is S10, and S1 is a sum of S10, S11 and S12; and/or, the third communicating hole comprises a third through hole and a fourth through hole sequentially communicated, the fourth through hole is a conical hole, an aperture of the fourth through hole gradually increases towards a direction away from the valve port, a stress area of the fourth through hole is S20, and S2 is a sum of S20, S21 and S22.

7. The electronic expansion valve as claimed in claim 1, wherein the valve head has the first communicating hole, the second communicating hole and the third communicating hole sequentially communicated along a direction from the first end to the second end, the aperture of the first communicating hole and the aperture of the third communicating hole are greater than an aperture of the second communicating hole; the electronic expansion valve further comprises: a screw, the screw is disposed in the valve head in a penetrating manner, the screw has a first rod section and a second rod section sequentially disposed along an axial direction, a section structure is disposed on a side wall of the screw, the section structure extends to a tail end of the second rod section from a middle of the first rod section, the balance channel is disposed between the section structure and the valve head; a valve sleeve, which is located in the first communicating hole, the valve sleeve has a first connecting hole, the second rod section is connected with the first connecting hole, and a first gap is disposed between the section structure and the first connecting hole; wherein a diameter of the first connecting hole is D3, a maximum value of the first gap is L1, and 0.5*D3>L1>0.1*D3; or, a cross section area of the first gap is S, and S>0.8 mm².

8. The electronic expansion valve as claimed in claim 7, wherein an axial length of the section structure is L2, a second gap is disposed between the section structure and the second communicating hole, a sum of the axial lengths of the first gap and the second gap is L3, and L2≥1.3*L3; or, wherein a distance between an end, away from the valve sleeve, of the section structure and an upper end face of valve head is L4, and L4≤3 mm.

9. The electronic expansion valve as claimed in claim 7, wherein the screw further has a third rod section, the third rod section is connected with an end, away from the valve port, of the first rod section, a diameter of the third rod section is greater than a diameter of the first rod section, a distance between an end, away from the valve sleeve, of the section structure and an end, close to the valve port, of the third rod section is L5, and L5≥2*D3.

10. The electric expansion valve as claimed in claim 1, wherein a first guide hole is formed in the guide sleeve, and a diameter of the first guide hole is D31; the valve head is movably disposed in the first guide hole in a penetrating manner, an annular groove is disposed on an outer side wall of the valve head, and the annular groove and the valve head are coaxially disposed; the electronic expansion valve further comprises:

a seal ring, the seal ring is disposed between the first guide hole and the annular groove, an outer diameter of the seal ring is D32, D32 is greater than D31, and a difference value of D32 and D31 is 0.1 mm-0.5 mm.

11. The electric expansion valve as claimed in claim 10, wherein an inner diameter of the annular groove is D34, an inner diameter of the seal ring is D35, and a difference value of D34 and D35 is −0.5 mm to 0.5 mm; or, wherein a width of the annular groove is L31, a diameter of a cross section of the seal ring is D33, and L31 is 1.1 to 1.4 times a size of D33.

12. The electric expansion valve as claimed in claim 10, wherein the outer diameter D32 of the seal ring is 6.5 mm-8.5 mm; or, wherein a diameter D33 of a cross section of the seal ring is 0.5 mm-1 mm.

13. The electronic expansion valve as claimed in claim 10, wherein the annular groove is located in a middle of the valve head.

14. The electronic expansion valve as claimed in claim 10, wherein a distance from a center line, vertical to an axis, of the annular groove to an end part of the valve head is L32, and L32 is 35% to 65% of a length L33 of the valve head; or, the distance L32 from the center line, vertical to the axis, of the annular groove to the end part of the valve head is 6.5 mm-8 mm.

15. The electronic expansion valve as claimed in claim 1, wherein the valve body comprises a valve seat, the valve seat has a valve cavity and a valve port, the valve port has a first conical hole section, a straight hole section and a second conical hole section which are connected sequentially, a diameter of an end part, away from the straight hole section, of the first conical hole section is greater than a diameter of an end part, connected with the straight hole section, of the first conical hole section, a diameter of an end part, away from the straight hole section, of the second conical hole section is greater than a diameter of an end part, connected with the straight hole section, of the second conical hole section, a length of the straight hole section is L41, a conical angle of the second conical hole section is A4, the length L41 of the straight hole section is 0.5 mm-1.5 mm, and the conical angle A4 of the second conical hole section is 20°-60°.

16. The electronic expansion valve as claimed in claim 15, wherein the valve head has a first outer side wall, which is matched with an inner wall of the first conical hole section to block the valve port, a diameter of the first outer side wall is D41, and D41 is 5 mm-8 mm.

17. The electronic expansion valve as claimed in claim 15, wherein a diameter of the straight hole section is D42, wherein D41−D42≥0.2 mm; or, wherein a conical angle of the first conical hole section is greater than the conical angle of the second conical hole section; the conical angle of the first conical hole section is B4, and a value of B4 is 25°-65°; or, wherein a maximum diameter of the first conical hole section is greater than a maximum diameter of the second conical hole section; a maximum diameter of the first conical hole section is D43, a value of D43 is 6 mm-9.5 mm, a maximum diameter of the second conical hole section is D44, and a value of D44 is 7 mm-8.5 mm.

18. The electronic expansion valve as claimed in claim 15, wherein the guide sleeve is fixed on the valve seat, and a part of the guide sleeve is located in the valve cavity; wherein the valve seat further comprises a first hole section and a second hole section disposed in a step along an axis, a first end of the second hole section is connected with the first hole section, a second end of the second hole section is connected with the valve cavity, a diameter of the first hole section is greater than a diameter of the second hole section, and the guide sleeve is in transitional fit with the second hole section.

19. The electronic expansion valve as claimed in claim 1, wherein the valve body comprises a valve seat, the valve seat has a first hole section, a second hole section and a valve cavity which are sequentially connected along an axis, the valve port is disposed on the valve seat, the valve port is connected with an end, away from the second hole section, of the valve cavity, and a diameter of the second hole section is smaller than a diameter of the first hole section;

the guide sleeve is fixedly disposed on the valve seat, the guide sleeve has a connecting section and a guide section which are connected with each other along the axis, the connecting section is disposed corresponding to the first hole section and the second hole section, the guide section is located in the valve cavity, a welding ring groove is annularly disposed on an outer side wall of the connecting section, wherein a diameter of the first hole section is D51, a diameter of the connecting section is D53, and 0.1 mm≥D51−D53≥0.02 mm.

20. The electronic expansion valve as claimed in claim 19, wherein the connecting section and the second hole section are in interference fit; wherein a diameter of the second hole section is D52, and 0.05 mm>D53−D52>0 mm; or, a diameter of the second hole section is D52, and D51−D52≥0.02 mm.

21. The electronic expansion valve as claimed in claim 19, wherein the connecting section has a first connecting section and a second connecting section, the weld ring groove is located between the first connecting section and the second connecting section, the second connecting section is located in the second hole section, a height of the second connecting section is L51, a height of the second hole section is L52, a distance between an end, close to the valve port, of the first connecting section and an end, close to the valve port, of the connecting section is L53, and L53>L52>L51.

22. The electric expansion valve as claimed in claim 21, wherein L51≥1 mm; or, wherein a height of the first connecting section is L54, and L54≥0.5 mm.

23. The electric expansion valve as claimed in claim 1, wherein a first opening is disposed on a side wall of the valve body, a second opening is disposed at a bottom end of the valve body, the valve port and the second opening are coaxially disposed, and the second opening communicates with the accommodating cavity through the valve port;

the guide sleeve is fixedly connected on the valve body, the guide sleeve and the valve port are coaxially disposed, the guide sleeve comprises a connecting section, a first cylindrical section, a buffer section and a second cylindrical section which are sequentially connected, the connecting section is configured for being fixedly connected with the valve body, the second cylindrical section is disposed close to the valve port, a diameter of the second cylindrical section is smaller than a diameter of the first cylindrical section, and a diameter of the buffer section decreases gradually in a direction from the first cylindrical section to the second cylindrical section.

24. The electronic expansion valve as claimed in claim 23, wherein the diameter of the first cylindrical section is D61, the diameter of the second cylindrical section is D62, and D61−D62≥1 mm; or, wherein a diameter D61 of the first cylindrical section is 8.5 mm-13 mm.

25. The electric expansion valve as claimed in claim 23, wherein the buffer section is a conical section, a conical angle of the buffer section is δ, and δ is 30°-90°; wherein a diameter of a first end, close to the valve port, of the conical section is equal to a diameter of the second cylindrical section, and a diameter of a second end, away from the valve port, of the conical section is equal to a diameter of the first cylindrical section.

26. The electric expansion valve as claimed in claim 23, wherein the electronic expansion valve further comprises a connecting pipe, the connecting pipe is connected with the first opening, a bottom end of the guide sleeve is higher than a bottom end of an inner wall of the connecting pipe, a distance between the bottom end of the inner wall of the connecting pipe and the bottom end of the guide sleeve is L61, and L61≥1 mm.

27. The electric expansion valve as claimed in claim 26, wherein in a radial direction of the connecting pipe, a bottom end face of the guide sleeve is disposed close to an axis of the connecting pipe.

28. The electronic expansion valve as claimed in claim 26, wherein an end, away from the valve port, of the buffer section is higher than a top end of the inner wall of the connecting pipe; wherein a distance between an end, away from the valve port, of the buffer section and a top end of the inner wall of the connecting pipe is L62, and L62≥1 mm.

29. The electric expansion valve as claimed in claim 26, wherein a diameter of the inner wall of the connecting pipe is D63, and D63 is 8 mm-14 mm.

30. The electric expansion valve as claimed in claim 1, wherein the valve body has a valve cavity, the valve cavity communicates with the valve port, the valve cavity comprises a first mounting section and a second mounting section disposed in a step, and an inner diameter of the first mounting section is greater than an inner diameter of the second mounting section;

the electronic expansion valve further comprises a nut sleeve, an annular mounting plate is disposed on a periphery of the nut sleeve, the annular mounting plate is located in the first mounting section, the annular mounting plate is in welding connection with an inner wall of the first mounting section, and the annular mounting plate and a side face of the first mounting section are in clearance fit;

an end, close to the valve port, of the nut sleeve has a second guide hole, the guide sleeve is partially located in the valve cavity, the guide sleeve is located at the end, close to the valve port, of the nut sleeve, an end, away from the valve port, of the guide sleeve extends into the second guide hole, the guide sleeve and the nut sleeve are coaxially disposed, and the guide sleeve and the second guide hole are in interference fit.

31. The electronic expansion valve as claimed in claim 30, wherein the inner diameter of the first mounting section is D71, an outer diameter of the annular mounting plate is D72, and D71–D72 is 0.02 mm-0.08 mm; or, the inner diameter D71 of the first mounting section is 13 mm-15 mm.

32. The electronic expansion valve as claimed in claim 31, wherein an inner diameter of the second guide hole is D73, an outer diameter of an end, away from the valve port, of the guide sleeve is D74, and 0≤D74–D73≤0.1 mm; or, 6.5 mm≤D74≤8 mm.

33. The electronic expansion valve as claimed in claim 30, wherein a thickness of the annular mounting plate is L71, a height of the first mounting section is L72, and L71 is greater than L72; or, the thickness L71 of the annular mounting plate is 0.3 mm-1.2 mm.

34. The electronic expansion valve as claimed in claim 1, wherein the electronic expansion valve further comprises a nut sleeve, the nut sleeve is disposed in the accommodation cavity, the nut sleeve is fixedly connected on the valve body, and a second guide hole is disposed at an end, close to the valve port, of the nut sleeve;

wherein the guide sleeve is disposed in the accommodation cavity, the guide sleeve is fixedly connected on the valve body, a top of the guide sleeve extends into the second guide hole, the second guide hole and the guide sleeve are in interference fit, a length, extending into the second guide hole, of the guide sleeve is L81, a diameter of a part, extending into the second guide hole, of the guide sleeve is D81, and L81≥D81/3.

35. The electronic expansion valve as claimed in claim 34, wherein a length of the second guide hole is L82, and L81≤0.9*L82; or, 3 mm≤L82≤5 mm.

36. The electronic expansion valve as claimed in claim 34, wherein a diameter of the second guide hole is D82, and 0≤D81–D82≤0.1 mm.

37. The electric expansion valve as claimed in claim 34, wherein 6.5 mm≤D81≤8 mm.

\* \* \* \* \*